(12) United States Patent
Brinig et al.

(10) Patent No.: US 11,853,701 B2
(45) Date of Patent: Dec. 26, 2023

(54) METHOD FOR RECOMMENDING AND IMPLEMENTING COMMUNICATION OPTIMIZATIONS

(71) Applicant: LitLingo Technologies, Inc., Austin, TX (US)

(72) Inventors: Kevin Brinig, Austin, TX (US); Todd Sifleet, Austin, TX (US); Madolyn Mertz, Austin, TX (US); Torbjorn Loken, Seattle, WA (US)

(73) Assignee: LitLingo Technologies, Inc., Austin, TX (US)

( * ) Notice: Subject to any disclaimer, the term of this patent is extended or adjusted under 35 U.S.C. 154(b) by 135 days.

(21) Appl. No.: 16/906,439

(22) Filed: Jun. 19, 2020

(65) Prior Publication Data

US 2020/0401766 A1 Dec. 24, 2020

Related U.S. Application Data

(60) Provisional application No. 62/865,238, filed on Jun. 23, 2019.

(51) Int. Cl.
*G06F 40/30* (2020.01)
*G06F 40/10* (2020.01)
*G06Q 10/107* (2023.01)
*G06Q 10/0639* (2023.01)

(52) U.S. Cl.
CPC ............. *G06F 40/30* (2020.01); *G06F 40/10* (2020.01); *G06Q 10/06393* (2013.01); *G06Q 10/107* (2013.01)

(58) Field of Classification Search
CPC ........ G06F 40/30; G06F 40/10; G06F 40/169; G06F 40/242; G06F 40/268; G06F 40/289; G06F 40/279; G06Q 10/06393; G06Q 10/107
See application file for complete search history.

(56) References Cited

U.S. PATENT DOCUMENTS

| 9,128,906 | B2* | 9/2015 | Peters | G06F 40/279 |
| 11,163,836 | B2* | 11/2021 | Ray | G06F 16/245 |
| 11,176,176 | B2* | 11/2021 | Bordawekar | G06F 16/285 |
| 11,269,929 | B2* | 3/2022 | Spangler | G06N 20/00 |
| 2015/0135053 | A1* | 5/2015 | Doornenbal | G06F 40/169 |
| | | | | 715/230 |
| 2016/0034260 | A1* | 2/2016 | Ristock | G06F 8/36 |
| | | | | 717/109 |
| 2016/0259778 | A1* | 9/2016 | Cookson | G06F 40/284 |

(Continued)

*Primary Examiner* — Abdelali Serrou

(57) ABSTRACT

Examples disclosed herein relate to a system including: one or more processors and at least one memory device where the one or more processors may receive communication data and convert the received communication data into a machine representation of the received communication data. The one or more processors may utilize one or more annotators with the machine representation of the received communication data to generate an annotated machine representation of the received communication data. The one or more processors may compare the annotated machine representation of the received communication data to one or more rule engines and transmit an initiation action signal based on the comparison of the annotated machine representation of the received communication data to the one or more rule engines.

20 Claims, 23 Drawing Sheets

(56) References Cited

U.S. PATENT DOCUMENTS

| | | | |
|---|---|---|---|
| 2016/0337295 A1* | 11/2016 | Bennett | G06Q 10/06 |
| 2016/0378742 A1* | 12/2016 | Doornenbal | G06F 40/289 |
| | | | 715/230 |
| 2017/0132815 A1* | 5/2017 | Peev | G06F 40/177 |
| 2018/0176173 A1* | 6/2018 | Keysers | H04L 51/32 |
| 2018/0196873 A1* | 7/2018 | Yerebakan | G06F 16/93 |
| 2019/0354544 A1* | 11/2019 | Hertz | G06F 16/35 |
| 2020/0076538 A1* | 3/2020 | Soultan | G06N 20/00 |

\* cited by examiner

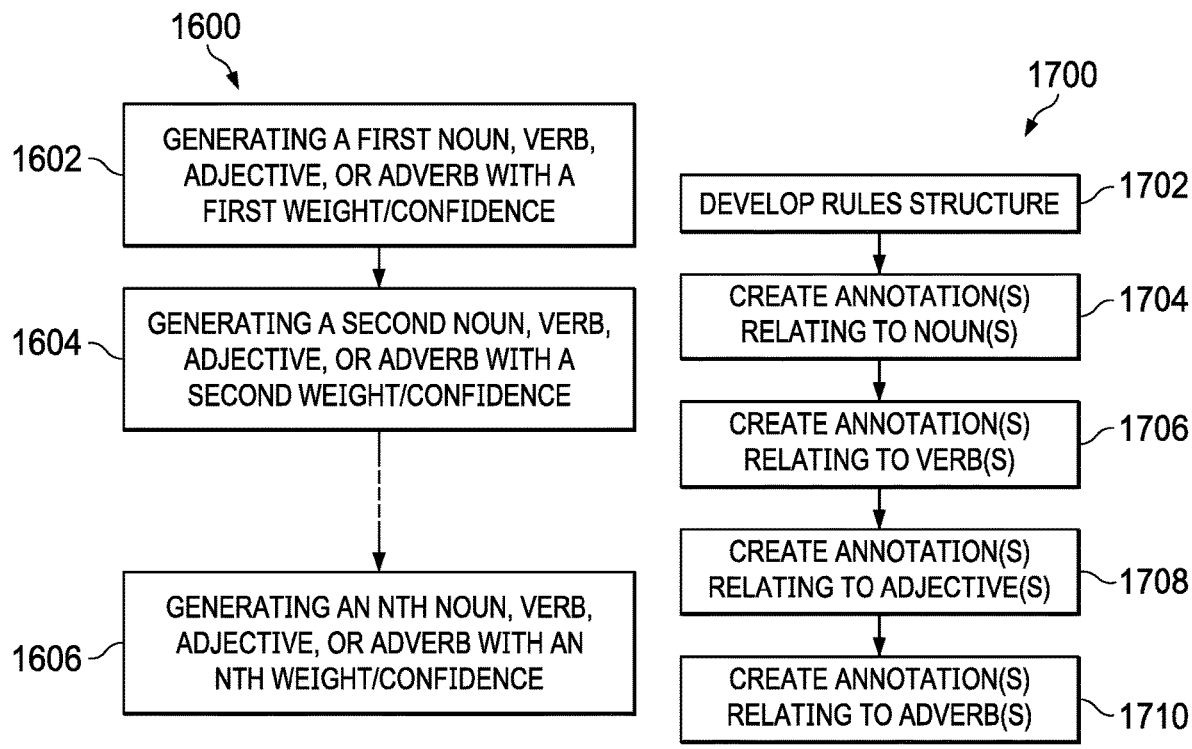
FIG. 16
FIG. 17
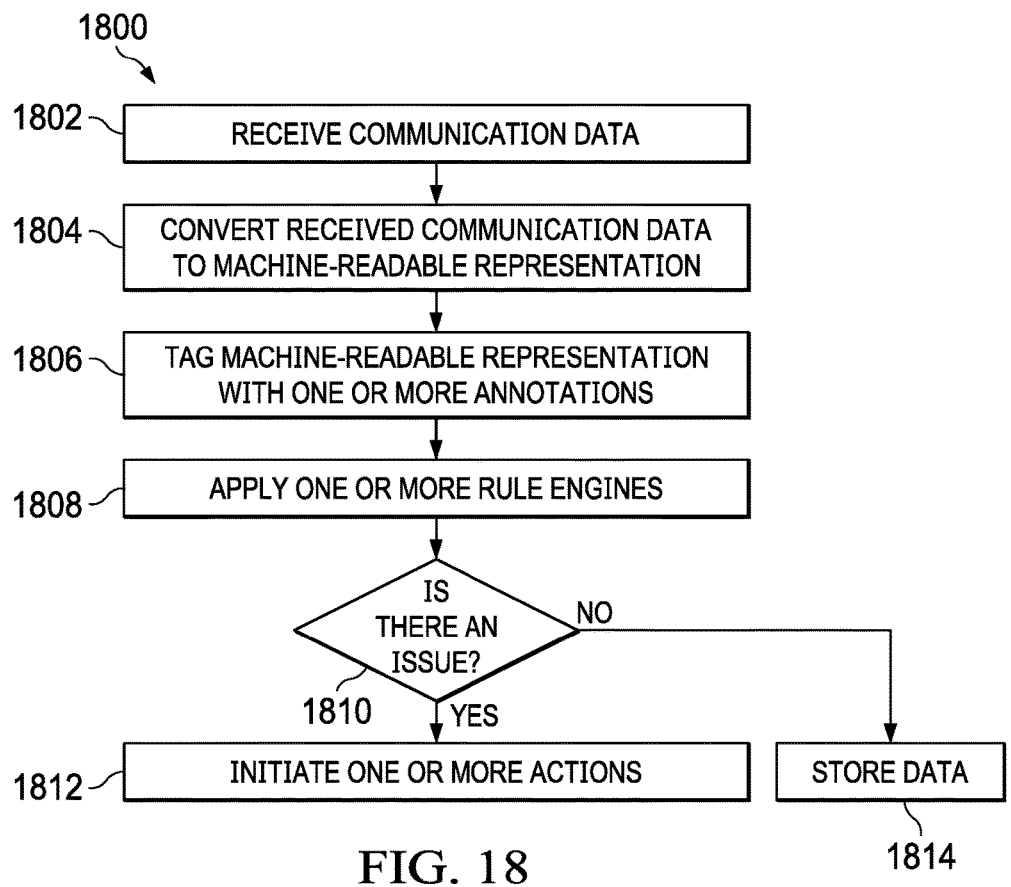
FIG. 18

METHOD FOR RECOMMENDING AND IMPLEMENTING COMMUNICATION OPTIMIZATIONS

REFERENCE

The present application claims priority to U.S. provisional patent application Ser. No. 62/865,238, entitled "Method for Recommending and Implementing Communication Optimizations", filed on Jun. 23, 2019, which is incorporated in its entirety herein by reference.

FIELD

The subject matter disclosed herein relates to systems, devices, and/or methods to monitor, evaluate, manage, optimize, and/or control communication systems. More specifically, the systems, devices, and/or methods may utilize one or more tools (e.g., annotators, rules, campaigns, etc.) to monitor, evaluate, manage, optimize, and/or control communication systems.

INFORMATION

All industries have numerous ways to dispense information. These numerous ways include letters, emails, texts, chats, social media platforms (e.g., Facebook, etc.), phone calls, customer service phone calls, presentations, employee group platforms, customer platforms, websites, brochures, any other communication method, and/or any combination thereof. This disclosure highlights enhanced systems, devices, and/or methods to monitor, evaluate, manage, optimize, and/or control communication systems.

BRIEF DESCRIPTION OF THE FIGURES

Non-limiting and non-exhaustive examples will be described with reference to the following figures, wherein like reference numerals refer to like parts throughout the various figures.

FIGS. 9B-1 to 9B-3 is another illustration of a communication modeling, according to one embodiment.

FIG. 16 is another procedural flow chart, according to one embodiment.

FIG. 17 is another procedural flow chart, according to one embodiment.

FIG. 18 is another procedural flow chart, according to one embodiment.

DETAILED DESCRIPTION

Figure 1:
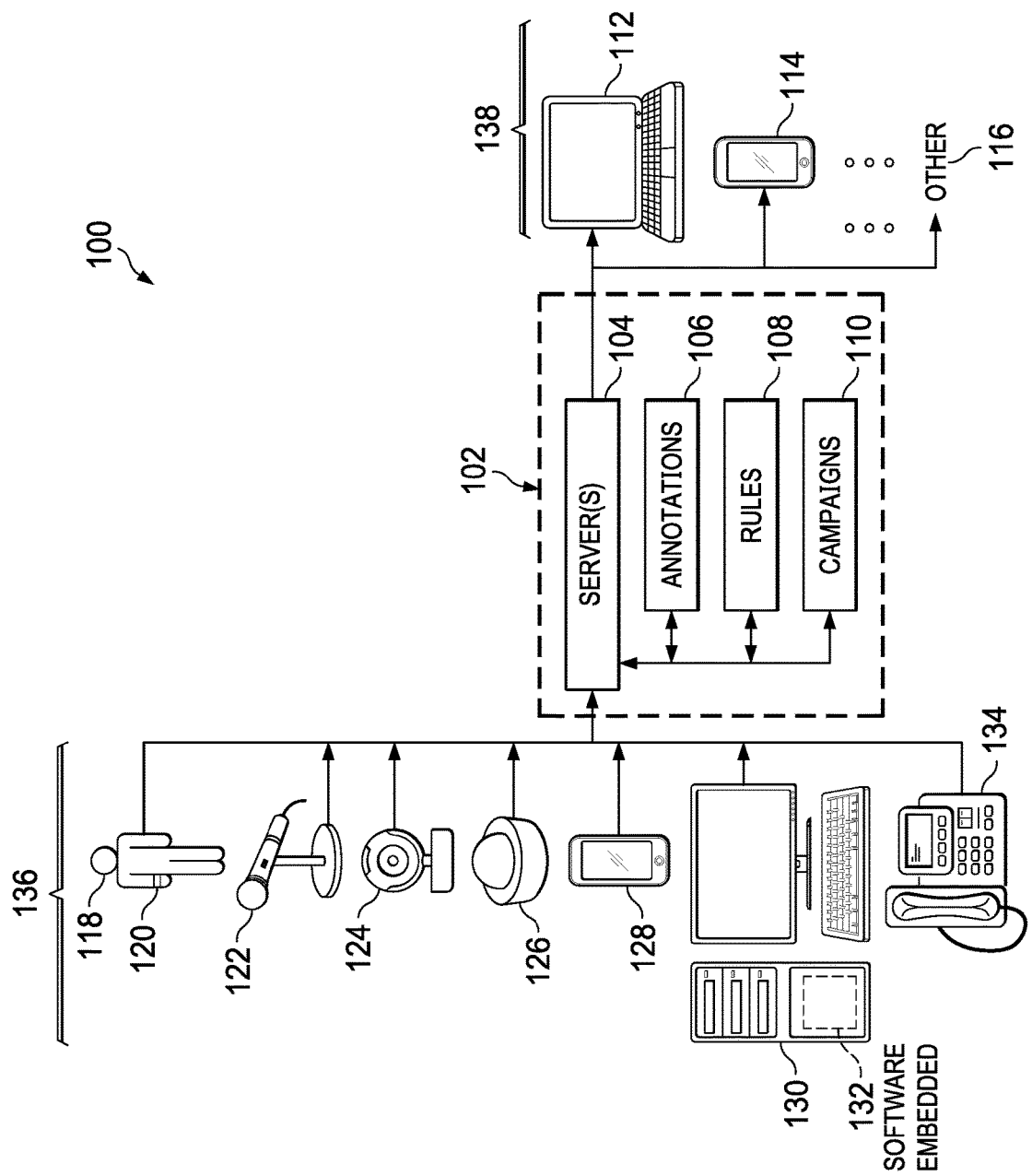
FIG. 1 is an illustration of a communication monitoring system, according to one embodiment.

In FIG. 1, an illustration of a communication monitoring environment 100 is shown, according to one embodiment. The communication monitoring environment 100 may include a communication monitoring system 102, input data sources 136, and/or output data sources 138. The communication monitoring system 102 may include one or more servers 104, one or more annotation systems 106 (and/or devices and/or modules, etc.), one or more rule engines 108, and/or one or more campaigns 110. The input data sources 136 may include one or more wearable devices 120 on a person 118, one or more microphones 122, one or more computer cameras 124, one or more cameras and/or sensors 126, one or more mobile devices 128, one or more computers 130 with and/or without embedded software 132, one or more phones 134 (e.g., landline phone, mobile, IP phone, etc.), and/or any other data source disclosed in this document and/or its equivalent. The output data sources 138 may include one or more computers 112, one or more mobile devices 114, and/or any other output data source disclosed in this document and/or its equivalent.

The communication monitoring system 102 may analyze numerous communication characteristics which include any characteristic(s) disclosed in this document and/or their equivalent. In various examples, communication factors may be a length of a missive, a length of a sentence(s), a length of a word(s), use of jargon, misspelling, incomplete sentences, tone, etc. For example, short, curt emails may be identifiers of sentiment of the sender and may also be evaluated against subsequent actions of the recipient to judge the effectiveness of the communication. In another example relating to tone, certain phrases and words or body language (via a camera) may be used to evaluate the tone of the communicator.

In addition, the communication monitoring system 102 may analyze biases (gender, inclusion, etc.), frequency of contacts (past contacts or the lack thereof), capitalization, syntax, and punctuation (or the lack thereof), keywords (presence or lack thereof), sentiment (certainty, vagueness, uncertainty, anger, happiness, excitement, anxiety, formality, etc.), topics (spread of topics, directness, presence of multiple topics), individual words, phrases, paragraphs, thoughts, or the entire document, specific type of email (command, request, informal, friendly, feedback, etc.), body language (speed of movement, sitting/standing, hand motions, etc.), and/or any other communication characteristic(s) disclosed in this document.

In addition, the communication monitoring system 102 may initiate and/or complete an effectiveness analysis. For example, context ingestion and communications may be evaluated for effectiveness. The specific type of communication (e.g., command, request, informal, friendly, feedback, etc.) can be analyzed to determine if subsequent action was taken by the recipient(s). This effectiveness scoring can be used to train further models or users.

In one example, a first project was completed by a first project team with a communication score of 90 in 10 weeks while a second project (similar to the first project) was completed by a second project team with a communication score of 70 in 20 weeks. In this example, the communication score for both the first project team and the second project team was based on one or more of biases (gender, inclusion, etc.), frequency of contacts (past contacts or the lack thereof), capitalization, syntax, and punctuation (or the lack thereof), keywords (presence or lack thereof), sentiment (certainty, vagueness, uncertainty, anger, happiness, excitement, anxiety, formality, etc.), topics (spread of topics, directness, presence of multiple topics), individual words, phrases, paragraphs, thoughts, or the entire document, specific type of email (command, request, informal, friendly, feedback, etc.), body language (speed of movement, sitting/standing, hand motions, etc.), and/or any other communication characteristic(s) disclosed in this document.

Figure 2:
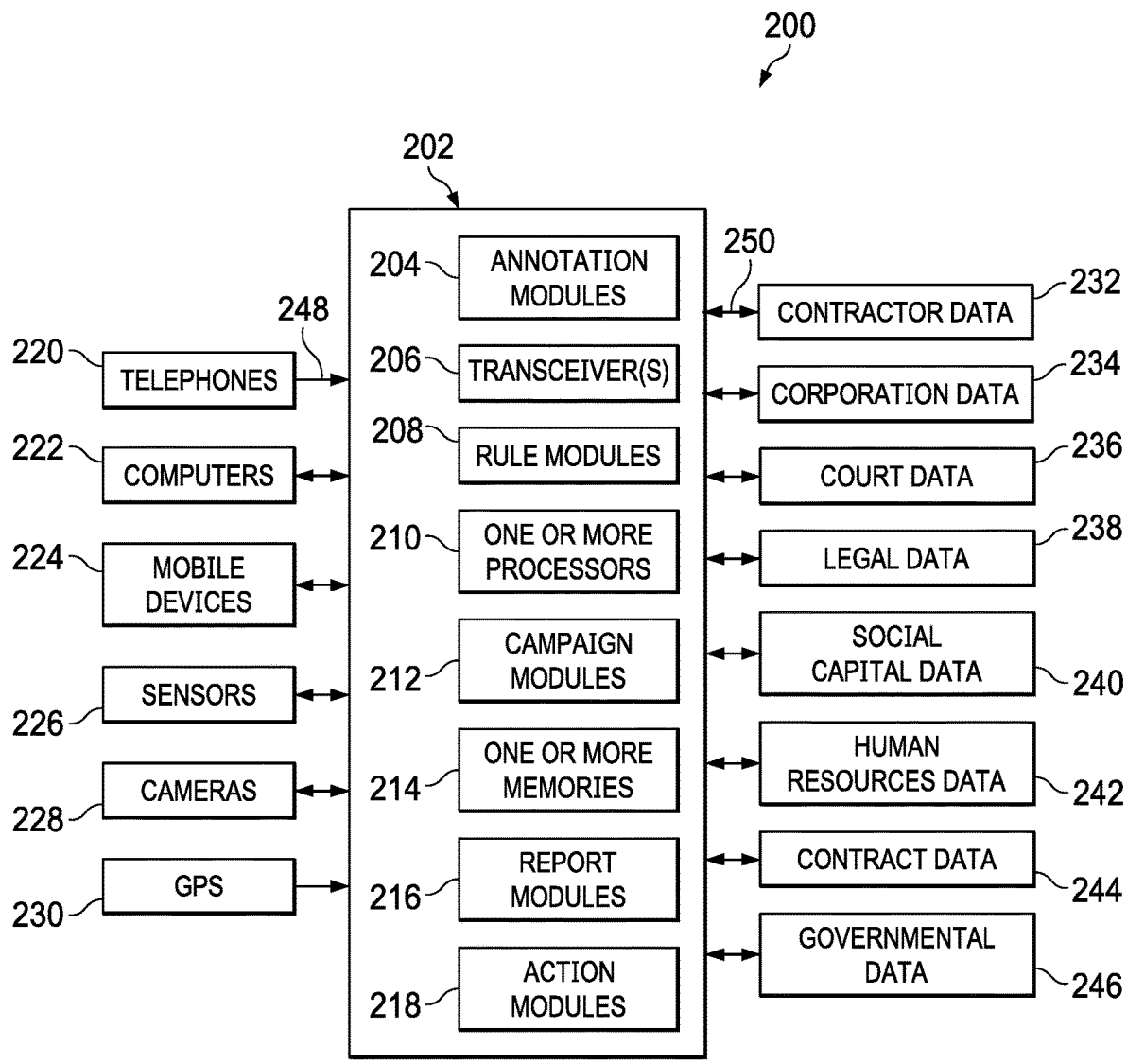
FIG. 2 is another illustration of a communication monitoring system, according to one embodiment.

In FIG. 2, a block diagram a communication monitoring environment 200 is shown, according to one embodiment. The communication monitoring environment 200 may include a communication monitoring system 202. The communication monitoring system 202 may include one or more annotation modules 204, one or more transceivers 206, one or more rule(s) modules 208, one or more processors 210, one or more campaign modules 212, one or more memories 214, one or more report modules 216, one or more action modules 218, and/or any other device, module, or functional feature disclosed in this document and/or its equivalent. The communication monitoring system 202 may receive and/or transmit data (via one or more communication links (e.g., a unidirectional link 248 and/or a bidirectional link 250)) to and/or from one or more telephones 220, one or more computers 222, one or more mobile devices 224, one or more sensors 226, one or more cameras 228, one or more GPS devices 230, one or more contractor data sources 232, one or more corporation data sources 234, one or more court data sources 236, one or more legal data sources 238, one or more social capital data sources 240, one or more human resources data sources 242, one or more contract data sources 244, one or more governmental data sources 246, and/or any other data source disclosed in this document and/or its equivalent.

The communication monitoring system 202 (and/or the communication monitoring system 102 and/or any other communication monitoring system disclosed in this document) may sit at the terminal layer (may also sit at browser application layer; may also sit at the server level). Note that any reference to a communication monitoring system, method, and/or device are interchangeable with any other reference to a communication monitoring system, method, and/or device—therefore, any and all elements are interchangeable in any disclosure. In addition, the communication monitoring system has organizational knowledge received from one or more data sources. The communication monitoring system may have personal knowledge of communicator(s) (composer, speaker, sender, initiator, etc.) and recipient(s). In addition, the communication monitoring system may know what application(s) the user is in when they are working. Further, various input sources could include multi-input mechanisms, microphone, video camera, keyboard, text to speech, any other device disclosed in this document, and/or any combination thereof. In addition, if a user is utilizing a text expanding software or copy and paste, this may be known to the system. The communication monitoring system may have data relating to the user capabilities, such as, lawyers or power users capabilities. In various examples, a person may be given one or more roles as a configuration user and/or a person may be given one or more roles as a user-user.

In addition, the communication monitoring system may apply to non-human generators of content as an overlay. Further, users can create specific campaigns. In addition, the communication monitoring system may complete a sentiment spell check (this is the interface—a way to describe how it works—underline specific terms, grade it holistically). Any and all communication types can be monitored by the communication monitoring system which include but are not limited to internal chats, external chats, emails, letters, external communications (e.g., Zendesk), text messages, and/or any other communication form disclosed in this document.

In one example, the communication monitoring system can utilize different organization(s) and sub-organization level(s) (e.g., level grading, lack of communications, etc.). In one example, if an individual has multiple organizations, the communication monitoring system can grade them against each other. As the communication monitoring system drills down, the communication monitoring system can grade organizations and sub-organizations. As the communication monitoring system drills down further, the communication monitoring system can attribute the sensitivity of grades to specific individuals that either have a contributive or dilutive effect on the organization's grade. The communication monitoring system can develop one or more plans to work with those people to fix the issue. In one example, Bob is a poor communicator (e.g., a communicator that could use training) because Bob's messages are infrequent, unclear, and lack focus. Whereas, Jill is a good communicator because Jill's messages are frequent, clear, and positive.

In another example, if the communication monitoring system utilizes multiple organizations and sub-organizations; the communication monitoring system can determine where communication is happening and where it is not happening. Programmatically identify organizations that aren't communicating effectively. It's equally valuable to quantify which organizations are communicating effectively (and why) and then benchmark against those. In addition, the communication monitoring system can overlay the performance evaluation system, pager duty, and/or github lines of code.

In addition, training integration can occur as part of real time alerts—can pop to the user to provide educational information. Based on our data, the training prescription changes based on the performance of a user. If Stacy is a poor performer and constantly messes up, she has to either take more training or a stricter training regimen. For example, Stacy was communicating to Bob but utilized words that made Bob sound like an employee instead of the contract work that he is. Stacy has a history of this problem;

therefore, X happened to Stacy. Whereas, Reggie has communicate to numerous people like Bob and has never had a problem. If Reggie is really good at this communication stuff, he doesn't have to take a stricter training regimen and he can even be freed from the training in order to save valuable resources.

In one example relating to the question of do all genders have the same experience; the communication monitoring system can analyze the tonal trends of a communicator (composer, speaker, sender, initiator, etc.). For example, the system can evaluate the language used in communications used directed towards one group of individuals and compare that language to language used in communications directed towards one or more other groups of individuals. The system can alert the communicator (composer, speaker, sender, initiator, etc.) or another interested party to the results of this comparison. In one example, Mike's communications are analyzed by the system and Mike communicates to women differently than men. More specifically, Mike's emails to women seem to downplay their importance whereas Mike's emails to men are more encouraging. In this example (and all the examples in this disclosure), the communication monitoring system, device, and/or method may have specific examples to show why the results indicated that Mike communicated differently with one group versus another group. All examples in this disclosure that result in a conclusion may be supported by one or more data points which determine the result.

In one example relating to contract workers and employment litigation, an internal power users who may be assigned a role (e.g., an HR professional or a lawyer; this is an example of Power Users and role recognition) may be assigned elevated permissions based on client preference. This user may have the ability to define users and their subsequent treatment. For example, a lawyer at a company that has litigation risk in the employment/contractor world, might want to prevent the creation of documents by some or all of a list of users. The communication monitoring system may take an action based on the inputs from any number of input/ingestion mechanisms of the user (This is an example of multimodal input ingestion). The communication monitoring system may prevent the submission of words, phrases, or tonal language, etc. as defined by algorithms or pre-identified outputs of another process (This is an example of list ingestion, algorithmic output ingestion, or machine learning analysis). In short, if user A wants to write word B in an email to person X (or persons XYZ), the communication monitoring system may perform an action contrary to the typical expected action of input. If user A inputs input B in Application X using computer device Z, the communication monitoring system can perform any number of actions preventing, changing, and/or removing the input.

In another example relating to manufacturing defect speculation avoidance, when a company employs, contracts with, and/or communicates with 3rd parties, often these third parties will freely communicate in the normal course of business on personal and company managed devices. In the normal course of business there are often speculative statements made in those communications. The communication monitoring system can capture inputs and alter the way the computing device acts following the inputs. For example, the communication monitoring system may analyze the communication that states "We guarantee that this new design will work" and change (or recommend to change) the wording to "We should try the new design."

In an example relating to contractual performance or non-performance, an oil exploration company signs a lot of contracts to drill for mineral rights. The contracts tend to specify that a well must be capped if it is uneconomic. An employee recently learns about the concept of an "uneconomic well" and speculates that a performing well is actually uneconomic in a company email despite having no background or expertise in the area. The communication monitoring system can analyze the email during the process of composition, recognize a specific word (or phrase or sentiment) like the word "uneconomic" and within the context of the broader language (including the communicator or composer, speaker, sender, initiator, etc.'s information if necessary) and prevent the email from being sent or prevent the word (or phrase, or sentiment, etc.) from being included in the email.

In another example, the communication monitoring system may compare time periods with communication trends (e.g., has there been a precipitous drop in healthy communication). Having established baseline scoring levels for an organization, the system can evaluate those scores over time. This may allow interested parties to analyze changes over time. Further, the system has the ability to ingest external information for comparative purposes. The system can ingest information such as stock price, language used at earnings calls or corporate presentations, headcount growth rates, geographical expansion or contraction, etc. and overlay this information in a comparative manner to the language trends within the organization.

In one example relating to meeting performance, the communication monitoring system can detect the physical presence of individuals in the room or on the call. The communication monitoring system can then determine (or can know previously ingested information about the) voices or speech patterns of individuals present (regardless of language spoken). The system can also detect whether individuals are not present (whether expected or not). Further the system can detect when individuals arrive to the meeting. The system can analyze the respective communication "presence" of individuals and determine if there are outsized voices in the room whether from a volume perspective, or a count of words, speed of speech, or other speech patterns. This information can be evaluated based on known information about the meeting itself, about the parties present, etc. The system can make recommendations or conclusions about the quality of the meeting, length, fairness, etc. The system may also make recommendations via a connected internet device in real time, for example, if a specific individual is overbearing in a meeting as determined by the system, that user may be warned via a smartwatch or smart phone. The system may have pre-defined understanding of what "equality of voice" should pertain to a specific meeting. This information may be combined with other information to create a holistic picture to identify bullying, victimization, under-representation, etc.

In one example relating to body language, using a visual ingestion device and a sound ingestion device, the communication monitoring system can overlay visual and vocal information where one or more parties are communicating. The communication monitoring system can evaluate changes in volume, tone, pitch, and speed of speech in addition to changes in speed of movement, height or elevation of the speaker (relative to original position and relative to other parties), the position of body parts, etc. The system can score the communication with respect to the goals of the meeting or presentation. This score can be attributed to the meeting itself, individuals involved, meeting type, etc. This information can be stored and evaluated over time.

In one example relating to forced training, the system can have the ability to force users into training modules depending on recent performance, historical performance, and/or trends and changes in performance.

In one example relating to certainty identification, the system may determine whether language has a measure of certainty. The system may have the ability to quantify differing levels of certainty. Further, this scoring mechanism may be used to train algorithms or users to improve communication.

In one example relating to user identification, the system can identify multiple users via self-identification mechanisms and voice keyed user roles. The user's voice can be automatically identified as well from previous conversations or recordings and a user ID can be assigned based on first encounter. In one example, communications between a specialized user and a non-specialized user (e.g., doctor to patient, engineer to marketing, lawyer to client, etc.) can be verified via the user identification procedure.

In one example, the communication monitoring system may put the definition of a word in parentheses, identify when somebody is "speaking out of their league" or "above their pay grade"—like a podiatrist talking about heart cancer or a call center worker skipping 4 management levels to speak with a VP, and/or use a word cloud of each employee type and you can cluster their wording and determine how different certain people's words are from their peers.

In one example relating to location data, the system has the ability to capture individuals location in a room based on the vocal inputs received from a recording device. In one example relating to rules engine(s), the system may allow a user (or an algorithm) to create a multitude of scenarios or configurations that can apply different rules to a particular communication depending on the desired monitoring outcomes. The system may offer an interface for the human configuration of said rules. The rules may be applied based on a number of factors.

In one example relating to evaluating a composer, the communication monitoring system may evaluate the characteristics of a communicator (composer, speaker, communicator, initiator, etc.) or composer using one or more templates. Evaluating the contents of the document with respect to those templates and identifying disparity. In addition, the communication monitoring system may receive a verbal, visual, and/or electronic input from a device. (via a network). Further, the communication monitoring system may prevent outcomes and/or predict outcomes. In addition, the communication system may provide a timing optimization function and/or analysis. For example, the system may gather information about the communicator (composer, speaker, communicator, initiator, etc.) and the recipient and determine when the optimal time to send an email might be and may make recommendations of that sort. For example, a review of Michael's emails indicates that he is most productive from X period to Y period on day of the week Z. Therefore, important emails are sent at this time while less important emails are held until after this time. Recipient(s) productivity may also be evaluated and the system may recommend that a communication be tailored to maximize productivity.

In one example relating to gendered fields, utilizing historical gendered fields, or fields with other biases, the system may be able to make specific targeted recommendations. In one example relating to prisoner use-case, the communication monitoring system may black out inappropriate communications to and/or from prison. In one example relating to evaluating subsequent actions of recipient, the communication monitoring system may evaluate the subsequent actions of the recipient(s) to evaluate the effectiveness of a communication. This may be done in a number of ways including automated detection of actions (e.g., the creation of meetings or future responses indicating something has been "completed"). In another example relating to language evaluation, the communication monitoring system may have the ability to evaluate existing documents retroactively. This can include internal communications as well as external facing communications like documents. In another example, companies may post blog articles with improper use of words in association with independent contractors which the communication monitoring system may flag for review and/or automatically delete.

In various examples of training models, the communication monitoring system may have training relating to certainty, fairness, effectiveness, bullying, under-representation, sexual harassment, productivity, time of day/week to communicate, and/or any other training relating to any concept disclosed in this document.

The communication monitoring system may have inputs, input capture, and multimodal capture and/or combination of inputs. For example, the communication monitoring system may have the ability to ingest context from a mouse, keyboard, microphone, camera, or any other sensing/perception device. This may include heart rate monitors, accelerometers, speedometers, internet of things connected devices, other connected computing devices, GPS devices, Bluetooth devices, thermal cameras, lie detector machines, smart phones, SDKs, APIs, etc. This may be done device by device, in a bundled fashion, or multistream. Capture, ingestion, compute, and compare need not happen simultaneously.

In one example relating to role assignment and power users, the communication monitoring system can treat different users with different treatments. For example, a user may have elevated view or configure privileges relative to the typical user. Further, the configured system may have the ability to apply certain rules or treatments to individual users or groups of users on a treatment by treatment basis or a user by user basis or a session by session basis.

In another example, the communication monitoring system can accept inputs that are the outputs of other processes offline or in real time. Further, context ingestion or information ingestion may incorporate raw data or it may incorporate outputs of other computational processes. For example, the system may ingest a raw video feed or the system may ingest a video feed (or footage) that has been analyzed or tagged in an additional step. This is possible for all ingestion types.

The communication monitoring system may initiate action(s), alteration(s), deletion(s), prevention of inputs, and/or any other action disclosed in this document. The system is capable of altering, editing, deleting, creating, responding to, preventing the creation or transmission of, delaying, ingesting into future processes, saving, counting, storing for review, and/or storing information. Further, the system may implement any number of user interface elements to any individual or group of users based on those inputs in real time, retroactively, or prior to ingestion in a predictive fashion. Further, the communication monitoring system may include predictive recommendations based on user characteristics and/or actions may be intelligently performed based on the context of the communicator(s) or the recipient(s)/audience. In addition, the timing of actions may be based on additional context of the situation, sentiment, and/or context.

Figure 3:
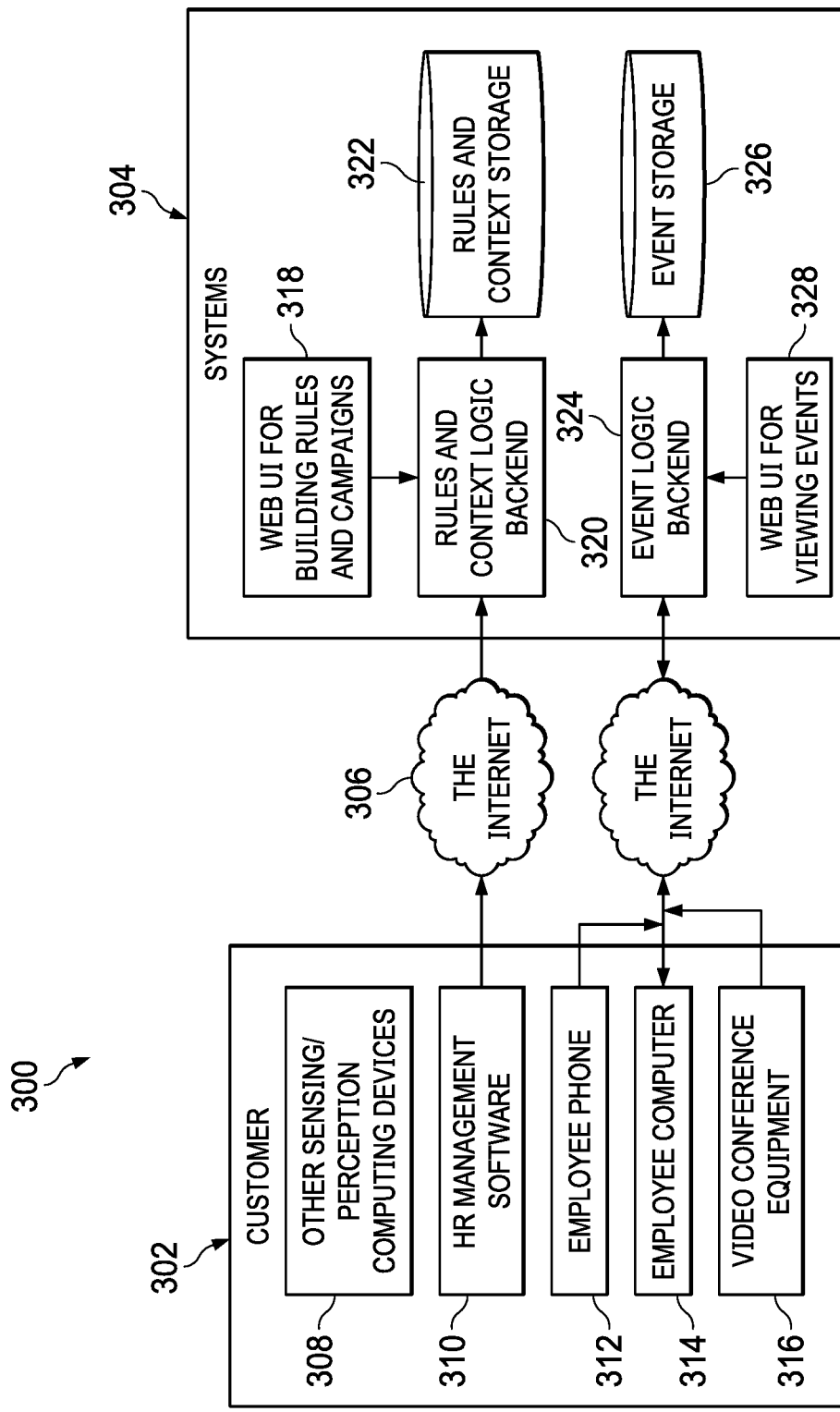
FIG. 3 is another illustration of a communication monitoring system, according to one embodiment.

In FIG. 3, an illustration of a communication monitoring environment 300 is shown, according to one embodiment. The communication monitoring environment 300 may include a customer side 302 and a communication monitoring side 304. The customer side 302 may include an other sensing/perception computing devices 308, a human resources management software 310, one or more employee phones 312, one or more employee computers 314, one or more video conference devices 316, and/or any other device disclosed in this document and/or its equivalent. The communication monitoring side 304 may include one or more web user interfaces for building rules and/or campaigns 318, one or more rules and context logic backends 320, one or more rules and context storage areas 322, one or more event logic backends 324, one or more event storage areas 326, one or more web user interfaces for viewing events 328, and/or any other device disclosed in this document and/or its equivalent. In addition, the communication monitoring side 304 and the customer side 302 may communicate via the Internet 306 and/or any other communication systems. In another example, the communication monitoring system can be integrated into the customer side 302.

Figure 4:
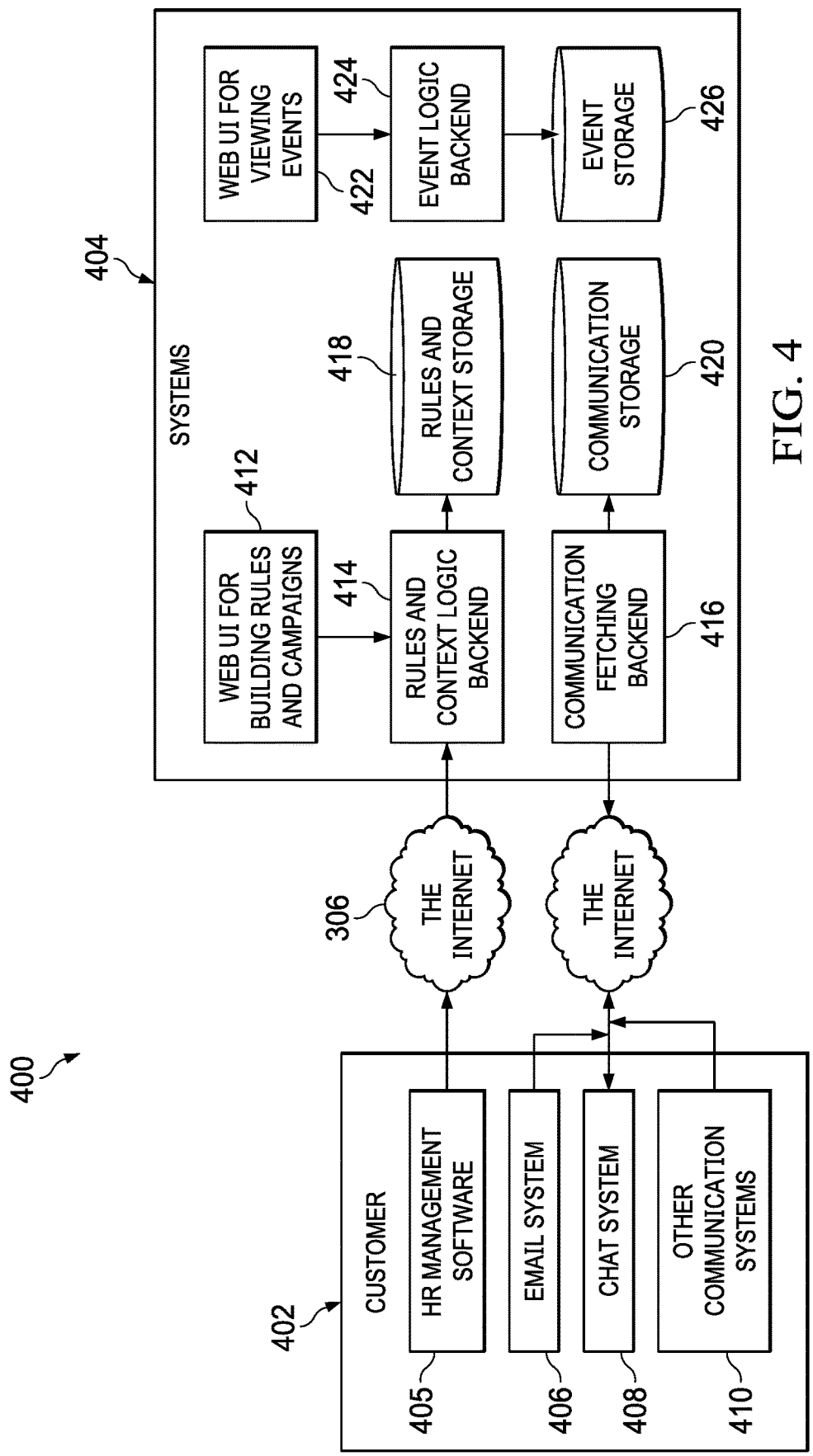
FIG. 4 is another illustration of a communication monitoring system, according to one embodiment.

In FIG. 4, an illustration of a communication monitoring environment 400 is shown, according to one embodiment. The communication monitoring environment 400 may include a customer side 402 and a communication monitoring side 404. The customer side 402 may include one or more human resources management softwares 405, one or more email systems 406, one or more chat system 408, one or more other communication systems 410, and/or any other communication system disclosed in this document and/or its equivalent. The communication monitoring side 404 may include one or more web user interface building rules and campaigns 412, one or more rules and context logic backends 414, one or more communication fetching backends 416, one or more rules and context storage areas 418, one or more communication storage areas 420, one or more web user interface for viewing events 422, one or more event logic backends 424, one or more storage areas 426, and/or any other device disclosed in this document and/or its equivalent. In addition, the customer side 402 and the communication monitoring side 404 may communicate via the Internet 306 and/or any other communication systems. In another example, the communication monitoring system can be integrated into the customer side 402.

Figure 5:
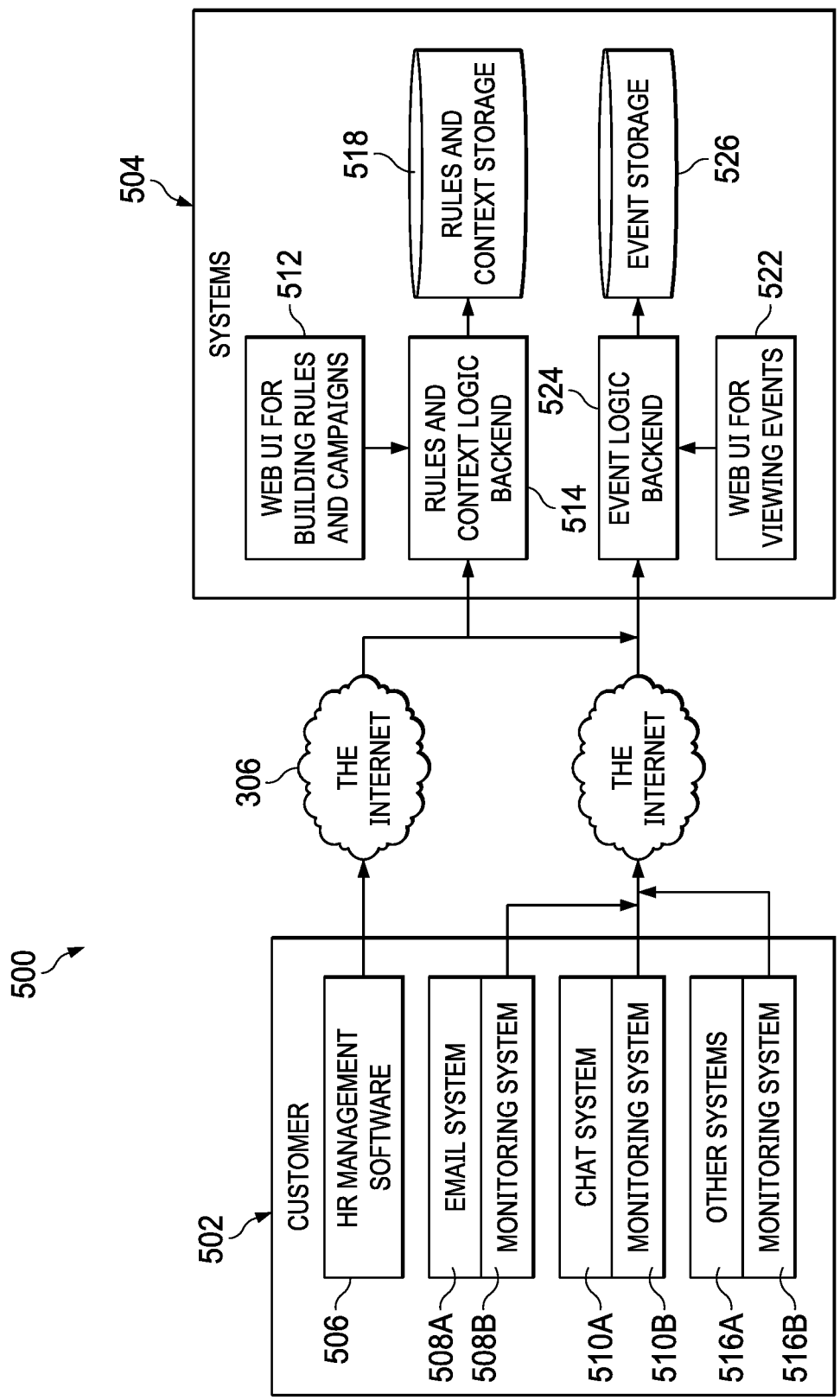
FIG. 5 is another illustration of a communication monitoring system, according to one embodiment.

In FIG. 5, an illustration of a communication monitoring environment 500 is shown, according to one embodiment. The communication monitoring environment 500 may include a customer side 502 and a communication monitoring side 504. The customer side 502 may include one or more human resources management softwares 506, one or more email systems 508, one or more chat system 510, one or more other communication systems 516, and/or any other communication system disclosed in this document and/or its equivalent. The communication monitoring side 504 may include one or more web user interface building rules and campaigns 512, one or more rules and context logic backends 514, one or more rules and context storage areas 518, one or more web user interface for viewing events 522, one or more event logic backends 524, one or more storage areas 526, and/or any other device disclosed in this document and/or its equivalent. In addition, the customer side 502 and the communication monitoring side 504 may communicate via the Internet 306 and/or any other communication systems. Further, one or more email systems 508 may be an integrated system with a customer email 508A and an email monitoring system 508B. The one or more chat system 510 may be an integrated system with a customer chat system 510A and a chat monitoring system 510B. The one or more other communication systems 516 may be an integrated system with a customer system 516A and a monitoring system 516B. In another example, the communication monitoring system can be integrated into the customer side 502.

Figure 6:
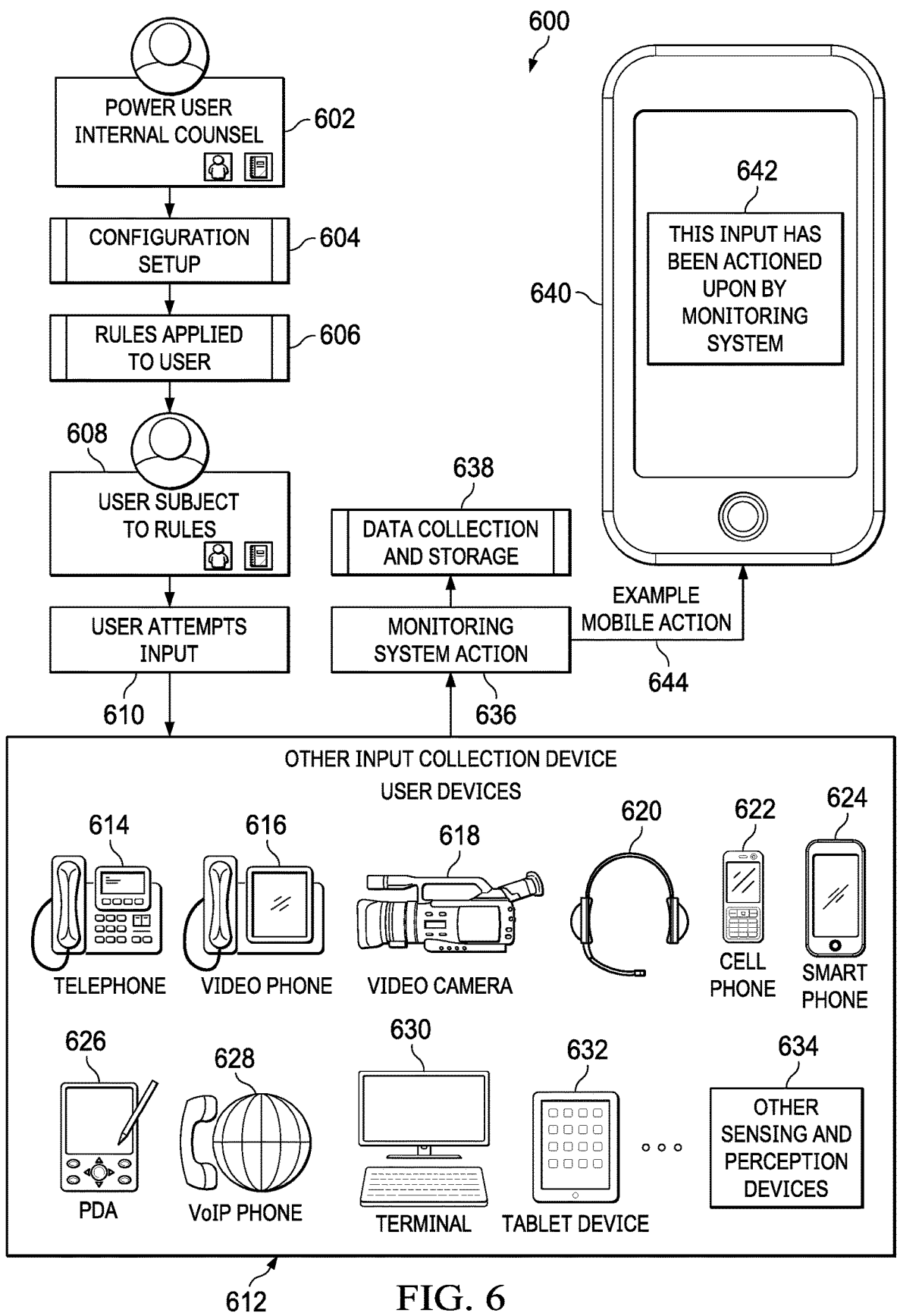
FIG. 6 is another illustration of a communication monitoring system, according to one embodiment.

In FIG. 6, an illustration of a communication monitoring system and procedural flow chart is shown, according to one embodiment. A communication monitoring system 600 may include a user internal counsel function (step 602). The communication monitoring system 600 may include a configuration setup (step 604). The communication monitoring system 600 may include applying rules to the user (step 606). The communication monitoring system 600 may determine whether the user is subject to one or more rules (step 608). The communication monitoring system 600 may include a user attempting to input data (step 610) via one or more of a telephone 614, a video phone 616, a video camera 618, a headset 620, a cell phone 622, a smart phone 624, a personal digital assistant 626, a VoIP phone 628, a terminal 630, a tablet 632, and/or any other sensing and perception device 634. The communication monitoring system 600 may include the monitoring system initiating one or more actions (step 636). The communication monitoring system 600 may include collecting and storing data (step 638). The communication monitoring system 600 may include initiating a message 642 on another mobile device 640 (step 644). In this example, the message 642 states "This input has been actioned upon by the system". In one example, the communication monitoring system determines that a fraud is about to occur by examining the terms "lets short the company stock" and "no one will ever know" and flags the communication.

Figure 7A:
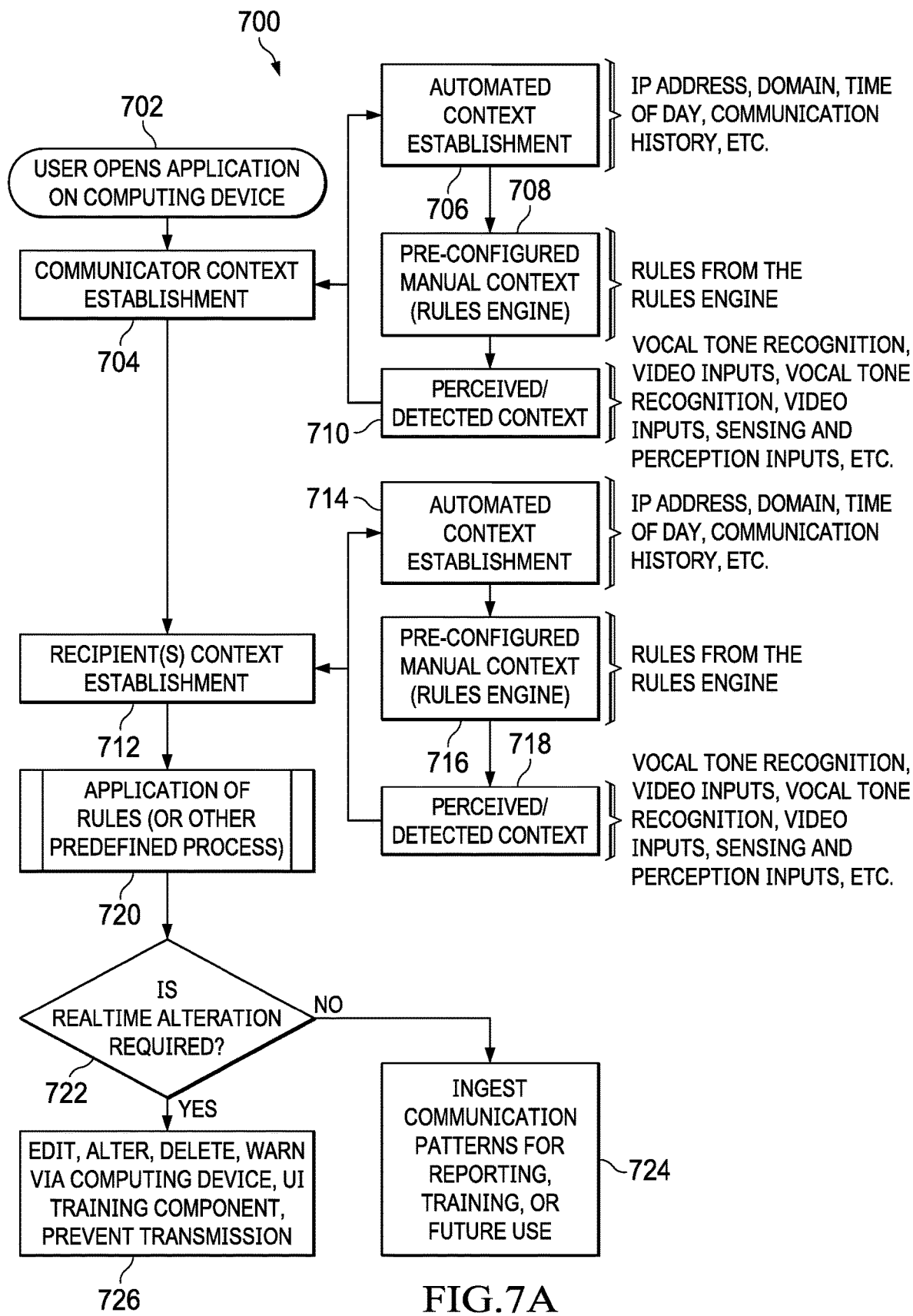
FIG. 7A is a procedural flow chart, according to one embodiment.

In FIG. 7A, a procedural flow chart is shown, according to one embodiment. A method 700 may include a user opening up an application on a computing device (step 702). The method 700 may include a communicator context being established (step 704). The method 700 may include a first automated context establishment function (step 706). The method 700 may include a first pre-configured manual context (rules engine(s)) function (step 708). The method 700 may include a first perceived/detected context function (step 710). The method 700 may include a recipient(s) context establishment function (step 712). The method 700 may include a second automated context establishment function (step 714). The method 700 may include a second pre-configured manual context (rules engine(s)) function (step 716). The method 700 may include a second perceived/detected context function (step 718). It should be noted that there may be up to Nth automated context establishment functions, Nth pre-configured manual context (rules engine(s)) function, and/or Nth perceived/detected context functions. The method 700 may include an application of rules (or other predefined process(es)) function (step 720). The method 700 may include one or more processors determining whether a real-time alteration is required (step 722). If no real-time alteration is required, then the method 700 may include ingest communication patterns for reporting, training, feedback procedures for the system itself, feedback to other processes, and/or any other use disclosed in this document (step 724). If a real-time alteration is required, then the method 700 may include editing, altering, deleting, warning, stopping, sending data to an approval procedure, and/or any other action disclosed in this document via the computing device, the user interface training component, and/or prevent any and all transmissions (step 726).

The technical implementation may utilize video inputs, comments on shared documents, Outlook extension version, Slack/chat bot version, Chrome Extension Version, Microphone ingestion version, Chatbot version, Terminal Layer, Smart Devices (sensing and perception logic e.g., multiple phones in the same room in proximity to each other), and/or any other device, system, and/or method disclosed in this document.

The system can be positioned in different ways for different use cases. The system positioning may also be a combination of implementations depending on the scope of client requests to achieve desired outcomes. The server level system may be primarily beneficial for ingestion and storage, while an implementation higher up in the stack may be more useful for immediate real time actions (e.g. alterations, blocking, notifications, etc.). The system can be implemented via imbedding into an organization's backend. This allows all data to remain on-premises for customers that have concerns about data sharing and privacy. This implementation can take the most severe actions like preventing information creation. The device-level implementation can be used for real-time, immediate actions in the strictest sense as well (in all applications across all devices). In this implementation, the system is installed onto individual devices (or networks they communicate with). This implementation has the ability to prevent the creation of information. For example, if a customer wanted to log every input from every device in a work environment, that customer would opt to install the software that sits at the terminal layer on managed devices and force installation via mechanisms currently available (e.g., managed systems or administration level installation). An example of where this is particularly valuable is in customer managed chat applications. If a customer is interested in de-risking these informal conversations, that customer would choose the application layer implementation. If a customer was interested in a less severe implementation and desires after-the-fact batch processing risk reduction, the system may be implemented at the storage layer. A customer can implement multiple combinations of the above to achieve the desired result.

Figure 7B:
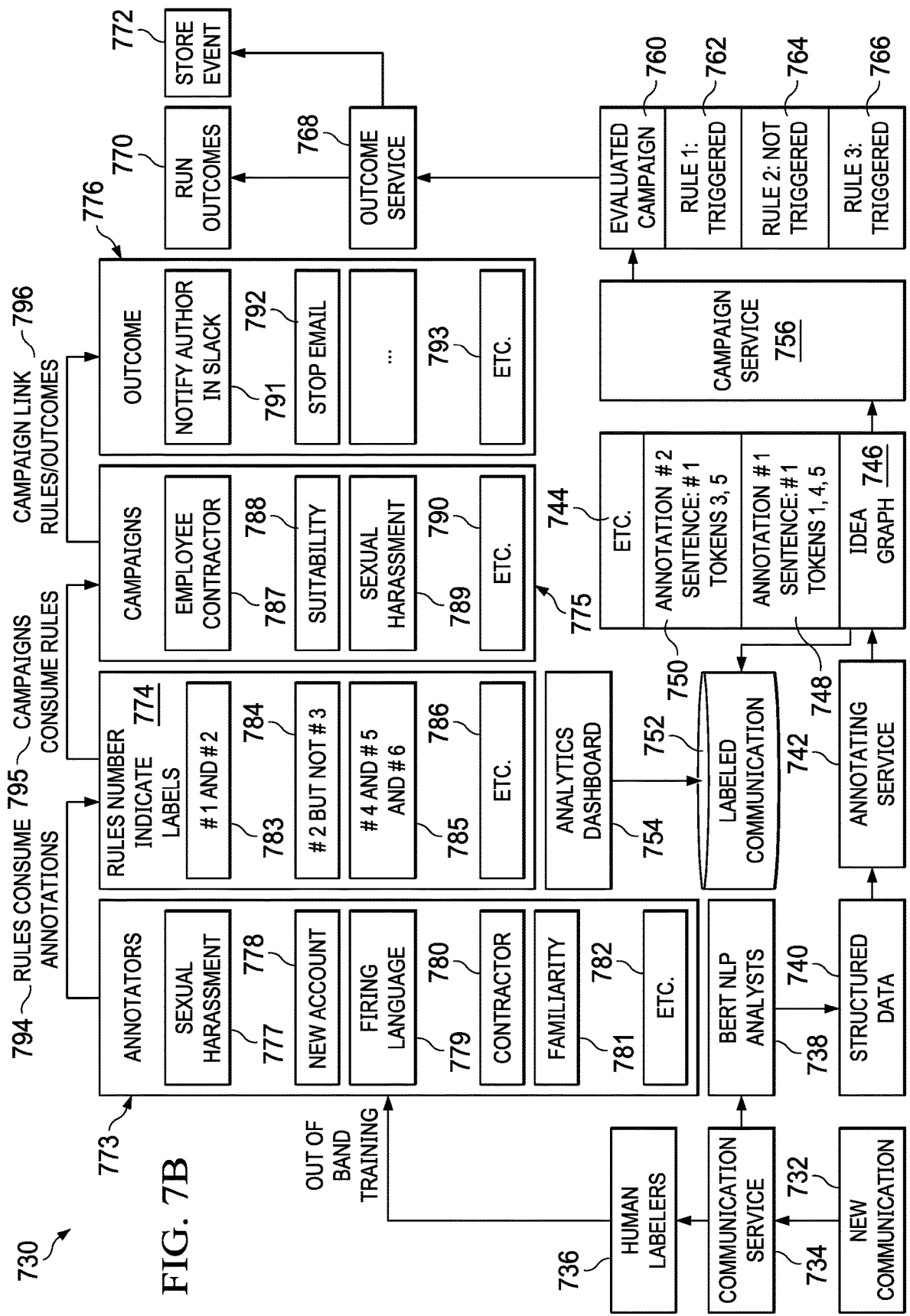
FIG. 7B is another procedural flow chart, according to one embodiment.

In FIG. 7B, another procedural flow chart is shown, according to one embodiment. A method 730 may include a new communication being created (step 732). The method 730 may include a communication service function (step 734). The method 730 may include a human labelers function (step 736). The method 730 may include a BERT NLP analysts (step 738). BERT is an open source machine learning framework for natural language processing (NLP). BERT is designed to assist computers in the process of understand the meaning of ambiguous language in text by using surrounding text to establish context. The method 730 may include a structured data function (step 740). The method 730 may include an annotating service function (step 742). The method 730 may include an annotator structure function (step 744). The annotator structure function 744 may include an idea graph function 746, a first annotator structure 748, and/or an Nth annotator structure 750). The method 730 may include a labeled communication function (step 752) and an analytics dashboard function (step 754). The method 730 may include a campaign service function (step 756). The method 730 may include a campaign function (step 758) where the campaign function 758 may include an evaluated campaign function (step 760), a first triggered rule (step 762), a first non-triggered rule (step 764), an Nth triggered rule (step 766), and an Nth non-triggered rule. The method 730 may include an outcome service function (step 768), a run outcomes function (step 770), and/or a store event function (step 772). Further, the method 730 may include an annotators function (step 773), a rules number indicate labels function (step 774), a campaigns function (step 775), and/or an outcome function (step 776). In this example, the method 730 may include a rules consume annotations function (step 794), a campaigns consume rules function (step 795), and/or a campaign link rules/outcomes function (step 796). In addition, the annotators function (step 773) may include a first category function 777, a new account function 778, a second category function 779, a third category function 780, a fourth category function 781, and/or an Nth category function 782. The rules number indicate labels function (step 774) may include a first criteria function 783, a second criteria function 784, a fourth criteria function 785, and/or an Nth criteria function 786. The campaigns function (step 775) may include a first campaign structure 787, a second campaign structure 788, a third campaign structure 789, and/or an Nth campaign structure 790. The outcome function (step 776) may include a first action 791, a second action 792, and/or an Nth action 793.

In various embodiments, the communication monitoring system may utilize a method for recommending communication optimizations, utilize a method for encoding professional expertise into models, utilize a method for matching meaning to models, and/or utilize a method for layering rules for identifying business risk.

In various examples, annotators, word matchers, AI annotators, combination annotator, and/or combinations thereof may be utilized by the communication monitoring system. In one example, an annotation can be as simple as a list of financial products. The list is encoded into the communication monitoring system, the part of speech is identified and attributed to the list and then the system is able to ingest any language and annotate that language (at the point of a match) with the meta-data that a financial product is being discussed in the communication. In another example, a language matcher is a feature that allows the system to use combinatorial processes to identify meaning for more complex topics that a basic annotation. For example, a language matcher annotator can consist of a list of nouns, noun phrases and verbs (and the resulting permutations thereof) to indicate a relationship between an actor and an action, for example. Language matcher annotators also take into consideration syntax and sentence structure. Language matcher annotators can also be any combination of parts of speech. When the communication monitoring system evaluates a communication, it creates a machine-readable representation of a communication and then maps the relationships between the communicated words and the meaning ascribed in the annotator in order to decide how to annotate the communication and map the meaning. For example, if an expert wanted to ascribe meaning to behavior relating to the firing of a certain type of worker, the expert could create an annotator comprised of all nouns that could be interpreted as representing "contractors" and all verbs that could be construed as "firing" (e.g., let go, fire, layoff, cast off, make redundant, etc.). In this way, the system can be encoded to describe all behaviors or actions representable in language. In another example, a context annotator can evaluate information about a communication in addition to simply the language. For example, a context annotator can understand that a message is of type: email or that it is an email sent from an individual to another individual or if it is a message sent from an individual to herself via a different email address. A context annotator can also annotate language based on 3rd-party integrations for example CRMs or people management databases/software. A context annotator can also determine data residency as it relates to things like export controls. In another example, an AI annotator is a machine-learned algorithm that has been trained to recognize sentiment, meaning, implications, or other human understanding concepts. An AI annotator similarly ingests communicated language and decides whether and how to annotate the communication. An AI annotator can be as simple as determining the overall sentiment of a communication as being "negative." In another example, combination annotators use basic annotators, word matchers, and AI annotators in combination to form an additional, unique annotator capable of assigning additional annotations to communications.

In one example of annotation, once a piece of language has been annotated, the system can ingest the resultant annotations to express expected meaning. For example, the following email illustrates how annotations can be applied to a communication.

Figure 22:
FIG. 22 is an illustration of a communication data, according to one embodiment.

FIG. 22 shows an example of a communication data, according to one embodiment.

1—Sender Gender—Context Annotator evaluates either the name of sender (and ascribes a confidence to the determination to annotate or, via 3rd-party integration knows Marcus' gender). This information may be obtained via any other data source disclosed in this document.

2—Sender Tenure—3rd-party or employee database integration allows the system to confidently annotate Marcus' tenure. This information may be obtained via any other data source disclosed in this document.

3—Sender Age—3rd-party or employee database integration allows the system to confidently annotate Marcus' age. This information may be obtained via any other data source disclosed in this document.

4—Sender Count of Direct Reports—Employee database allows the system to confidently annotate Marcus' direct reports (and the fact that Marcus is a manager). These can be 2 separate annotations. This information may be obtained via any other data source disclosed in this document.

5—Sender Job Title—Communication indicates Marcus' title. The system is able to identify the footer of an email based on the communication type. This information could also be determined from an employee database. This information may be obtained via any other data source disclosed in this document.

6—Recipient Count—System counts the number of recipients. The system also knows whether certain recipients are groups.

7—Recipient Gender—If a single recipient, system knows recipients gender and annotates as such.

8—Recipient Tenure—See line 2. This information may be obtained via any other data source disclosed in this document.

9—Recipient/Sender Reporting Relationship—Context annotator evaluates sender/recipient relationship based on 3rd-party integration or employee database. This information may be obtained via any other data source disclosed in this document.

10—Message type—System knows the type of communication being sent based on URL or application.

11—Message Sentiment—AI annotator determines sentiment of overall communication and piecemeal excerpts.

12—Frustration—Annotator evaluates specific language indicative of frustration.

13—Mentions Financial Product.
14—Mentions Selling Behavior.
15— Profanity.
16—Boasting language.
17—Communicates Management Pressure/Names Manager.
18—Mentions Subtly Unethical Behavior.
19—Discusses under-represented or disadvantaged class. This information may be obtained via any other data source disclosed in this document.
20—Informal language.
21—Patronizing language.
22—Mentions Regulators.
23—Mentions Financial Suitability.
24—War Analogies/Language (Kill, destroy, conquer).

In one example relating to applying rules, using annotators similar to those above, a user could create a rule that identifies when inappropriate selling behavior (e.g., a first targeted action) is taking place. This rule would be defined by the presence (and weighting) of a number of annotators. For example: annotator determining that the author has a sales role; annotator indicating previous misbehavior by the author; annotator indicating the presence of the verb sell (or its synonyms); annotator indicating the object of the selling action is a financial product; annotator indicating that the communication comes from a company that sells financial products; annotator indicating a the product is not financially suitable for the customer (e.g., customer is low-income, bankrupt, behind on payments, not qualified for product X); and/or annotator indicating that there might be reservations about behavior in the communication. The communication monitoring system allows experts to create as many annotators as they want and eloquently combine them to represent a confidence level in meaning. Each annotator can be a binary or can be weighted to define a threshold of confidence because annotators do not all have the same effect on the decision making process with regard to meaning. Not all annotators must be triggered or included in the ultimate confidence in the decision to trigger a rule, but their presence or absence enhances the systems understanding of meaning.

The communication monitoring system may also have the ability to test different versions of rules against previous communications and against previous versions of the same rule, thereby learning and improving the decision making process. The user may combine a number of rules and annotators to expand the topic coverage within a specific campaign. For example, rules relating to inappropriate selling behavior (e.g., a first targeted action) could be combined with rules relating to sales language relating to guarantees (where the salesman/saleswoman does not have authority to be making guarantees). Further, the user could layer on a rule relating to quid pro quo or bribery (e.g., a second and/or Nth targeted action) into a campaign that ensures salespeople are behaving within the law and within policy. All of these rules (in aggregate) comprise the campaign around "Sales Policy" and allow users to logically group rules. Additionally, the communication monitoring system can recommend groupings of rules as new campaigns based on observed behavior within an organization or based on behavior observed in other organizations.

In an example relating to annotator interface, the communication monitoring system provides an interface that allows the user to populate the information necessary to create annotators in the language of their choice. The system allows a user to interact with annotators in numerous ways. This includes creating, reading, updating, or deleting. The annotators can be created and saved for future use (in the rules interface).

In one example relating to comparing communications to annotators and rules, when a sentence is ingested by the communication monitoring system, the communication monitoring system mathematically represents the sentence using pathways. Pathways are a means of representing all the meaning in a sentence across countless dimensions. Pathways are a mathematical, spatial representation of how meaning develops and exists within a communication. They can exist within sentences, across sentences, between phrases, between or amongst words and symbols, or amongst documents or communications.

In another example, annotators also have pathways that may be similar or different when compared to the pathways existent in a communication or block of text. The system has the ability to mathematically compare the communication pathway to the universe of annotator pathways. The comparative process is analogous to a goodness of fit process that runs recursively. Unlike a regression or sum of squared errors model, however, the pathway comparison is optimizing for meaning and business value and constantly learns new meaning pathways for the communication and new definitions for the annotation pathways. Representing the pathways as spatial models allows the system to perform a minimization process to determine goodness of fit. The resulting calculation determining distance from perfect allows the system to attribute a confidence level to each annotation, which can then be combined with the annotation's weight within a specific rule to arrive at a confidence level and reduce false positives.

In another example relating to rules interface, through the process for combining annotators and creating relationships between them, a user can express any communication risk. The user can select from the thousands of annotators or create an annotator of their liking to express any concept. That annotator can operate immediately or the user can decide to begin training the annotator using distributed machine learning techniques. By combining annotators, the user can create rules. The incremental complexity of a given rule (via layering annotators and annotator relationships) improves the accuracy and power of the rule. In one example, using the rules engine interface, a user can select any annotator they like, assign it weights, assign vectors to express directionality, assign relationships between (and amongst) other annotators, and label the rule to express their desires.

In another example of utilizing rules, a user could create an annotator that comprised all the nouns relating to the concept of gratuity (e.g., tip, tipping, gratuity, etc.). Then that user could create an annotator for the concept of inclusion with service using phrases containing adjectives and/or verbs (e.g., included, part of the fare, comes with the price, etc.). The user could then create an annotator that indicated that a communication was being sent by a customer service representative. The user could then create an annotator identifying the recipient of a communication as being a 1099 contractor working for a gig-economy company. If the user combined these four annotators into a rule for customer service agents, the rule would trigger any time a customer service agent errantly attempted to write to a contractor indicating that "tip is included" in the fare.

In another example relating to campaigns and actions, the user interface further allows users to combine rules into campaigns. This allows the user to logically group rules into subject areas (or policies, or initiatives) of their liking.

In one example relating to actions, actions can be set on the campaign level or specified at the campaign user interface level to apply to specific rules within that campaign. Actions can include, but are not limited to: notifying the author, notifying the author and the recipients, notifying a 3rd-party not originally privy to the communication (e.g., legal counsel or compliance department, or HR), notifying a group of 3rd-parties not originally privy to the communication (e.g., multiple lawyers or multiple compliance officers), triggering a forced training for the author (written or multimedia), opening another application on the author's device, closing an application on the author's device, blocking access to the communication platform used to send the communication, logging a user out of certain applications, revoking permissions on specific applications or devices or logging a user (usually the author) out of their machine entirely, blocking the message prior to send or submit, logging an event in a database, modify the document, any action disclosed in this document, and/or any combination thereof.

For example, if a user had a campaign consisting of rules relating to employee conduct as it relates to the treatment of co-workers, the campaign could contain a rule relating to harassment. The actions assigned to a given rule or campaign can be dependent on the egregiousness of the violation. If an author attempted to harass a co-worker via office chat for example, any number or combination of the above actions could be taken by the system under the employee conduct campaign.

In one example relating to targeting, the communication monitoring system allows a user the ability to target a campaign to specific applications, devices, and users. For example, if a user wanted to set up a campaign relating to "authorized sales activities," the user could limit the deployment of that campaign to members of the sales team. Further, the user could assign different thresholds of acceptability for phone conversations vs. written conversations. Lastly, the user could apply one set of thresholds to emails sent from office accounts and a separate rule-set for text messages on cellular phones.

In one example relating to encoding expert knowledge, the communication monitoring system allows experts to define annotators, rules, and campaigns. An individual who has a great deal of expertise in a particular field (e.g., risk mitigation, laws, human or behavioral psychology, organizational behavior, criminal behavior, etc.) can encode their expertise in a way that allows for the immediate, real-time monitoring and surveillance of all communications flowing into and from an organization.

In another example, the communication monitoring system learns from the topics that experts focus on. The system is able to determine which areas are common amongst organizations and in which areas particular organizations may be lacking. The system can make recommendations for new annotators, rules, and campaigns in situations where it is deemed prudent.

In one example of dashboarding and metrics, the communication monitoring system aggregates information from all platforms of communications to present the user with an overview of system performance and organizational behavior.

In one example, the communication monitoring system is intelligently managing annotations to prevent overloading the system. In one example relating to rules engine(s), the communication monitoring system can combine annotations in the form of rules to express desired meaning. For example, an expert can indicate that the presence of annotations 1, 3, 7, and 15, but the lack of annotation 16 or annotation 17 would indicate that a communication is indicative of potential illegal activity based on a professional understanding of a specific law. This allows the system to encode professional expertise into a machine learning system. Further, the expert can assign suggested weights to the differing annotations within the rule to evaluate business impact as opposed to simple sum of squared errors. These suggested weights can be tested and validated using back testing and moderated review.

In various examples, the communication monitoring system has the ability to intervene before a communication is saved or sent because it monitors and analyzes in real-time as the end-user types. Technically, any "action" (as defined above) can be triggered in real-time.

In one example relating to using annotators to ingest additional context, the communication monitoring system may integrate with CRMs, databases, etc. to ingest items of context. The communication monitoring system then annotates communications with these pieces of context In various examples, the communication monitoring system may utilize and understand different language types, jargon, sentence structure(s), implied level of education, and/or any other language characteristic.

Figure 8:
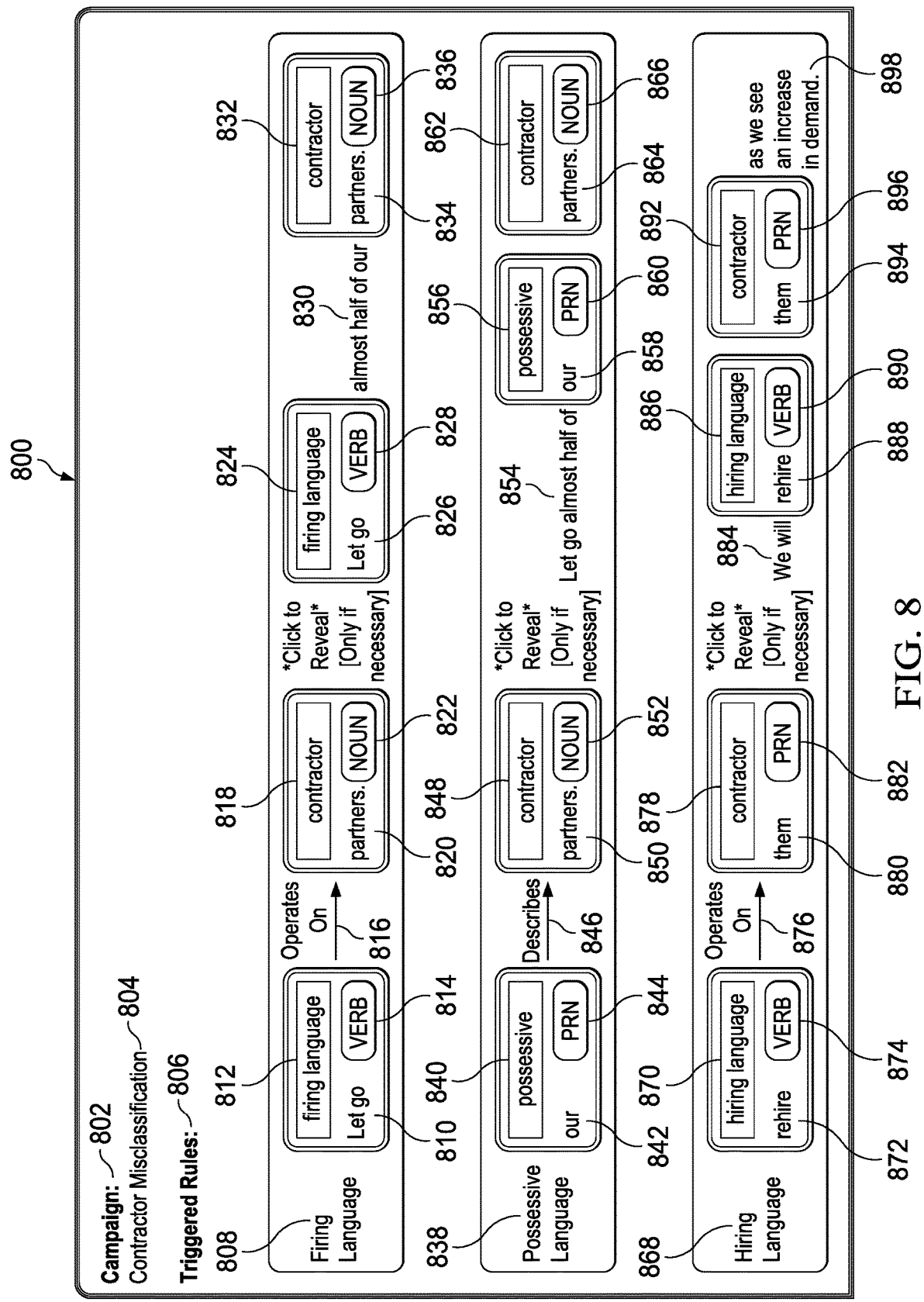
FIG. 8 is an illustration of a communication modeling, according to one embodiment.

In FIG. 8, an illustration of a communication modeling 800 is shown, according to one embodiment. The communication modeling 800 is of a message from a first person (e.g., Mclain) to a second person (e.g., John) which stated "John, I wanted to fill you in on how the virus has impacted our business here in Austin. Local demand was down 50% YoY for March & April—May is projected to finish down— 45%. As a result we have: Let go almost half of our partners. We will rehire them as we see an increase in demand. Added additional incentives for customers to further differentiate our services from the likes of Handy, Shortlist, ETC. I'll keep you updated as things progress. Best, Mclain." The monitoring system may look at the entire message and/or any portion of the message. In this example, the monitoring system has analyzed the entire message and has determined that the following portion should be further examined. As a result we have: Let go almost half of our partners. We will rehire them as we see an increase in demand. In this example, a title area 802 with a title 804 is shown. Further, a triggered rules area 806 is shown with a first category 808, a second category 838, and an Nth category 868. The first category 808 may be firing language. In this example, a first analyzed term 810 (e.g., Let go) has a first word identifier 812 (e.g., verb) and a first annotator identifier 812 (e.g., firing language). Further, a second analyzed term 820 (e.g., partners) has a second word identifier 822 (e.g., noun) and a second annotator identifier 818 (e.g., contractor). In addition, there is a first link 816 (e.g., operates on) between the first analyzed term 810 and the second analyzed term 820. In another example, a third analyzed term 826 (e.g., Let go) has a third word identifier 828 (e.g., verb) and a third annotator identifier 824 (e.g., firing language). Further, a fourth analyzed term 834 (e.g., partners) has a fourth word identifier 836 (e.g., noun) and a fourth annotator identifier 832 (e.g., contractor). In addition, there are additional words 830 in this sentence that have little to no valve in the analysis.

The second category 838 may be possessive language. In this example, a first analyzed term 842 (e.g., Let go) has a first word identifier 844 (e.g., pronoun) and a first annotator identifier 840 (e.g., possessive). Further, a second analyzed term 850 (e.g., partners) has a second word identifier 852 (e.g., noun) and a second annotator identifier 848 (e.g., contractor). In addition, there is a second link 846 (e.g., describes) between the first analyzed term 842 and the second analyzed term 850. In another example, a third analyzed term 858 (e.g., Let go) has a third word identifier 860 (e.g., pronoun) and a third annotator identifier 8856 (e.g., possessive language). Further, a fourth analyzed term 864 (e.g., partners) has a fourth word identifier 866 (e.g., noun) and a fourth annotator identifier 862 (e.g., contractor). In addition, there are additional words 854 in this sentence that have little to no valve in the analysis.

The Nth category 868 may be hiring language. In this example, a first analyzed term 872 (e.g., rehire) has a first word identifier 874 (e.g., verb) and a first annotator identifier 870 (e.g., hiring language). Further, a second analyzed term 880 (e.g., them) has a second word identifier 882 (e.g., pronoun) and a second annotator identifier 878 (e.g., contractor). In addition, there is a third link 876 (e.g., operates on) between the first analyzed term 872 and the second analyzed term 880. In another example, a third analyzed term 888 (e.g., rehire) has a third word identifier 890 (e.g., verb) and a third annotator identifier 886 (e.g., hiring language). Further, a fourth analyzed term 894 (e.g., them) has a fourth word identifier 896 (e.g., pronoun) and a fourth annotator identifier 892 (e.g., contractor). In addition, there are additional words 884 in this sentence that have little to no valve in the analysis.

The communication monitoring system utilizes, highlights, and/or analyzes the differences between words. One of the key take-away is that the communication monitoring system is able to express the relationships between words or phrases (e.g., the arrows that indicate A operates on B or A describes B). For example, A, B, C . . . are in the same sentence. A did B; therefore, A operates on B. In another example, A describes B or A is decoupled from B, C.

Figure 9A:
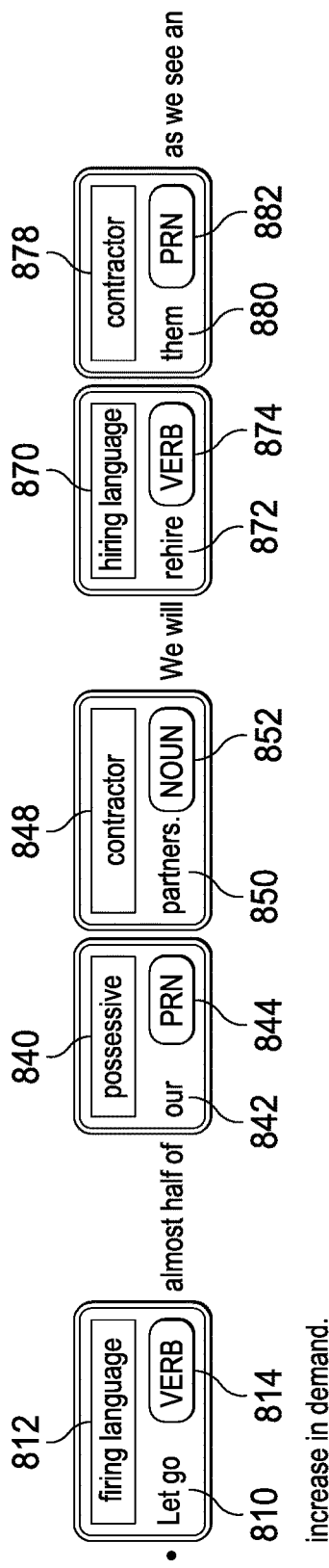
FIG. 9A is another illustration of a communication modeling, according to one embodiment.
Figures 1, 9B:
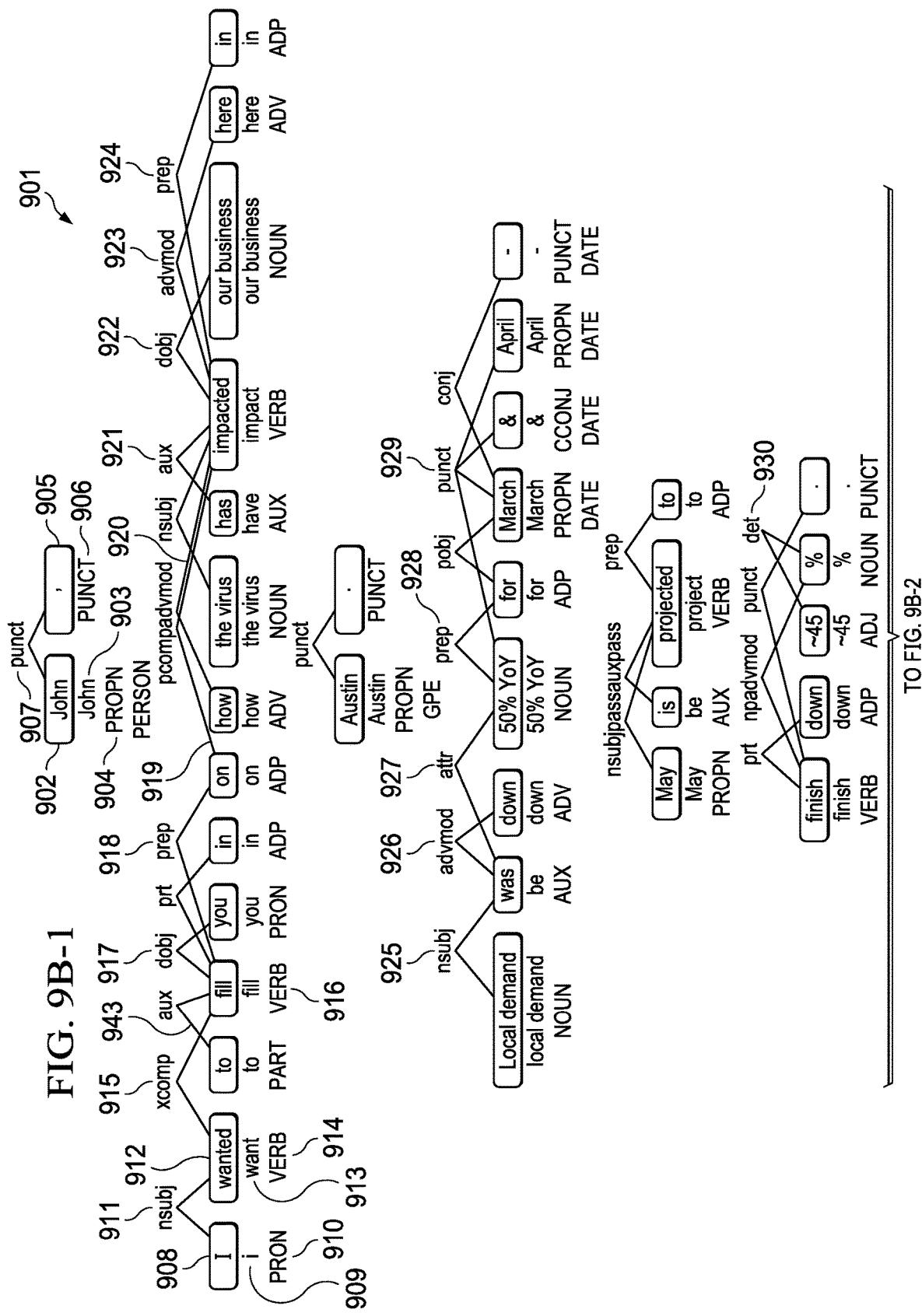
Figures 2, 9B:
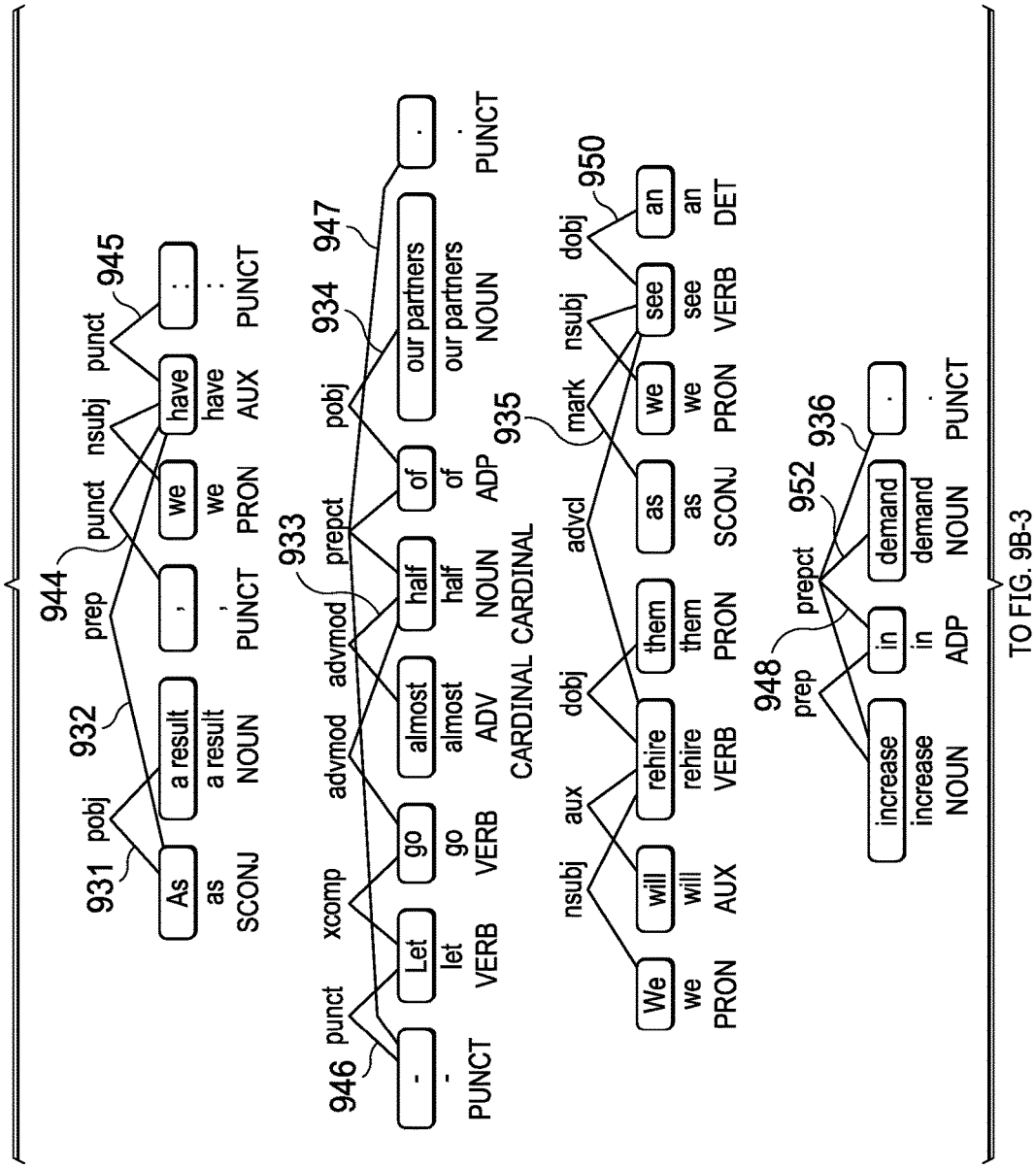
Figures 3, 9B:
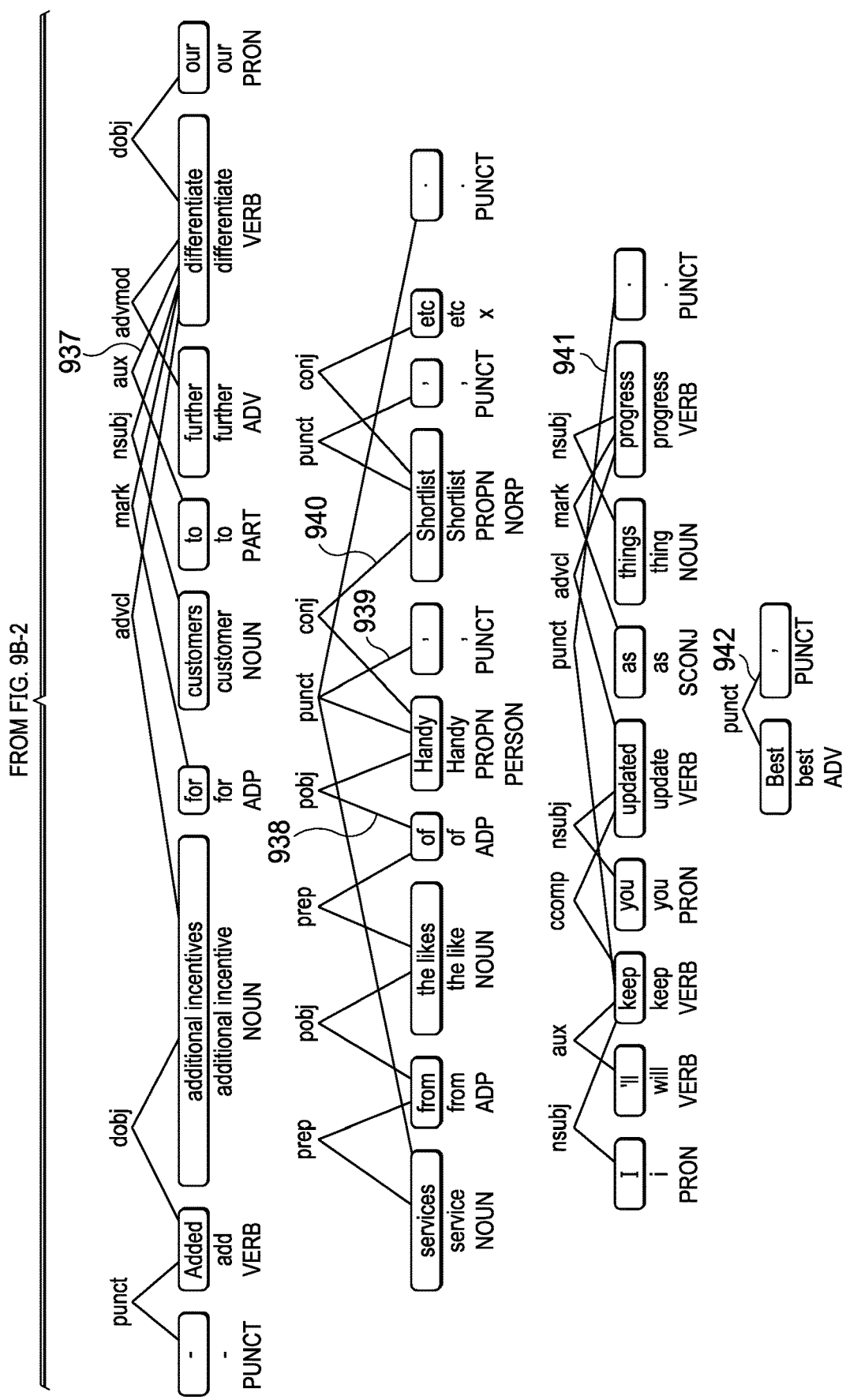

In FIGS. 9A to 9B-3, illustrations of communication modelings are shown, according to one embodiment. In the example shown in FIG. 9A, the monitoring system has analyzed an entire message 900 and has determined that the following portion should be further examined. As a result we have: Let go almost half of our partners. We will rehire them as we see an increase in demand. In FIGS. 9B-1 to 9B3, multiple relationships are shown. In one example, a first term 902 (e.g., John) is broken down into a simplified word 903 and a first word category 904 (e.g., proper noun or PROPN for short). Further, a second term 905 is broken down into a second word category 906 (e.g., punctuation or PUNCT for short). The first term 902 and the second term 905 are linked by a first link 907 which indicates that the link is based on punctuation. In another example, a third term 908 (e.g., I) is broken down into a simplified word 909 and a third word category 910 (e.g., pronoun or PRON for short) and a fourth term 912 (e.g., wanted) is broken down into a simplified word 913 (e.g., want) and a fourth word category 914 (e.g., verb) are linked via a second link 911 which indicates that the link is based on noun subject (e.g., nsubj). In addition, the fourth term 912 is linked via a third link 915 to a fifth term fill 916 which indicates that the link is based off of xcomp. In addition, there is a fourth link 943 between the terms to and fill based on aux. Further, there is a fifth link 917 between the terms file and you based on dobj. In addition, there is a sixth link 918 between the terms fill and on based on prep. Further, there is a seventh link 919 between the words on and impacted based on pcompadvmod. In addition, there is an eighth link 920 between the terms how and impacted based on pcompadvmod. Further, there is a ninth link 921 between the words has and impacted based on aux. Further, there is a tenth link 922 between the words impacted and our business based on dobj. In addition, there is an eleventh link 923 between the terms impacted and here based on advmod. Further, there is a twelfth link 924 between the terms impacted and in based on prep. In addition, there is a thirteenth link 925 between the words local demand and was based on nsubj. Further, there is a fourteenth link 926 between the terms was and down based on advmod. In addition, there is a fifteenth link 927 between the words was and 50% YoY based on attr. In addition, there is a sixteenth link 928 between the terms 50% YoY and for based on prep. Further, there is a seventeenth link 929 between the terms Mach and & based on punctuation. Further, there is an eighteenth link 930 between the words −45 and % based on det. Continuing on FIG. 9B-2, there is a nineteenth link 931 between the words as and a result based on pobj. Further, there is a twentieth link 932 between the words as and have based on prep. In addition, there is a twenty-first link 944 between the terms, and have based on punctuation. Further, there is a twenty-second link 945 between the terms have and. In addition, there is a twenty-third link 946 between the terms—and let based on punctuation. In addition, there is a twenty-fourth link 933 between the words almost and half based on advmod. Further, there is a twenty-fifth link 934 between the words of and our partners based on pobj. Further, there is a twenty-sixth link 947 between the terms—and. based on punctuation. In addition, there is a twenty-seventh link 935 between the words as and see based on mark. Further, there is a twenty-seventh link 950 between the words see and an based on dobj. Further, there is a twenty-eighth link 948 between the terms in and. based on prepct. In addition, there is a twenty-ninth link 952 between the words in and demand based on prepct. Further, there is a thirtieth link 936 between the terms in and. based on prepct. Turning to FIG. 9B-3, a thirty-first link 937 between the terms to and differentiate is established based on aux. Further, a thirty-second link 938 between the terms of and Handy is based on pobj. In addition, a thirty-third link 939 between the terms Handy and is based on punctuation. In addition, a thirty-fourth link 940 between the terms Handy and Shortlist is based on conj. Further, a thirty-fifth link 941 between the terms keep and. is based on punctuation. In addition, a thirty-sixth link 942 between the terms Best and, is based on punctuation.

In one example, stemma means to utilize the suffix of a word. For example, the suffix of wanted is want. Xcomp may be an open clausal complement. In one example, an open clausal complement (xcomp) of a verb or an adjective is a predicative or clausal complement without its own subject. The reference of the subject is necessarily determined by an argument external to the xcomp (normally by the object of the next higher clause), if there is one, or else by the subject of the next higher clause. These complements are always non-finite, and they are complements (arguments of the higher verb or adjective) rather than adjuncts/modifiers, such as a purpose clause. The name xcomp is borrowed from Lexical-Functional Grammar. In a specific example, "He says that you like to run" xcomp(like, run). In another example, "I am ready to go" xcomp(ready, go). In another example, "Bob asked Mike to respond to his offer" xcomp (ask, respond). In another example, "Steve considers him a fool" xcomp(considers, fool). In another example, "Steve considers him honest" xcomp(considers, honest). In one example, dobj may be a direct object. The direct object of a verb phrase is the noun phrase which is the (accusative) object of the verb. For example, "Bob gave me a raise" dobj(gave, raise). In another example, "We won the lottery" dobj(won, lottery). In one example, prep may be prepositional modifier. A prepositional modifier of a verb, adjective, or noun is any prepositional phrase that serves to modify the meaning of the verb, adjective, noun, or even another preposition. In the collapsed representation, this may be used only for prepositions with noun phrase complements. For example, "Jennifer saw a cat in a hat" prep(cat, in). In one example, nsubj may be a nominal subject. A nominal subject is a noun phrase which is the syntactic subject of a clause. The governor of this relation might not always be a verb: when the verb is a copular verb, the root of the clause is the complement of the copular verb, which can be an adjective or noun. For example, "Joe defeated Chris" nsubj (defeated, Joe). In another example, "The dog is cute" nsubj(cute, dog). In one example, advmod may be an adverb modifier. An adverb modifier of a word is a (non-clausal) adverb or adverb-headed phrase that serves to modify the meaning of the word. For example, "Artificially modified food" advmod(modified, artificially). In another example, "less frequent" advmod(frequent, less). In one example, an attributive (Attr) may be a relation intended for the complement of a copular verb such as "to be", "to seem", "to appear", etc. In one example, a determiner (det) may be the relation between the head of an noun phrase and its determiner. For example, "The woman is here" det(woman, the). In another example, "Which car do you prefer?" det(car, which). In one example, pobj is an object of a preposition. The object of a preposition is the head of a noun phrase following the preposition, or the adverbs "here" and "there". (The preposition in turn may be modifying a noun, verb, etc.) Unlike the Penn Treebank, we here define cases of VBG quasi-prepositions like "including", "concerning", etc. as instances of pobj. (The preposition can be tagged a FW for "pace", "versus", etc. It can also be called a CC—an is distinguish from conjoined prepositions.). In the case of preposition stranding, the object can precede the preposition (e.g., "What does ATM stand for?"). In another example, "Bob sat on the chair" pobj(on, chair). In one example, prepc is a prepositional clausal modifier. In the collapsed representation, a prepositional clausal modifier of a verb, adjective, or noun is a clause introduced by a preposition which serves to modify the meaning of the verb, adjective, or noun. For example, "She purchased it without paying a premium" prepc without(purchased, paying). In one example, aux may be an auxiliary. An auxiliary of a clause is a non-main verb of the clause, e.g., a modal auxiliary, or a form of "be", "do" or "have" in a periphrastic tense. In another example, conj may be a conjunct. A conjunct is the relation between two elements connected by a coordinating conjunction, such as "and", "or", etc. In one example, the communication monitoring system treats conjunctions asymmetrically: The head of the relation is the first conjunct and other conjunctions depend on it via the conj relation. In one example, "Bob is big and honest" conj(big, honest). In another example, "The family either ski or snowboard" conj(ski, snowboard). All of these examples may be combined in any fashion and/or procedure.

The communication monitoring system may convert words to an idea graph. The communication monitoring system may obtain communication data. The communication monitoring system may then use NLP tools to represent the words and their relationships with one another. The communication monitoring system may annotate the communication and express it in a "graphical representation" (e.g., a sentence labeling diagram including meaning in addition to parts of speech). The individual document, sentences, paragraphs, and "tokens" (words or word phrases) are then assigned different annotations that represent that meaning as seen in FIGS. 9B-1 to 9B3. After this process, the communication monitoring system may never look at the words or language itself again. All the rules engine processes operate on the annotation layer (i.e., on the meaning ascribed to the communication) as opposed to the communication itself.

Figure 10:
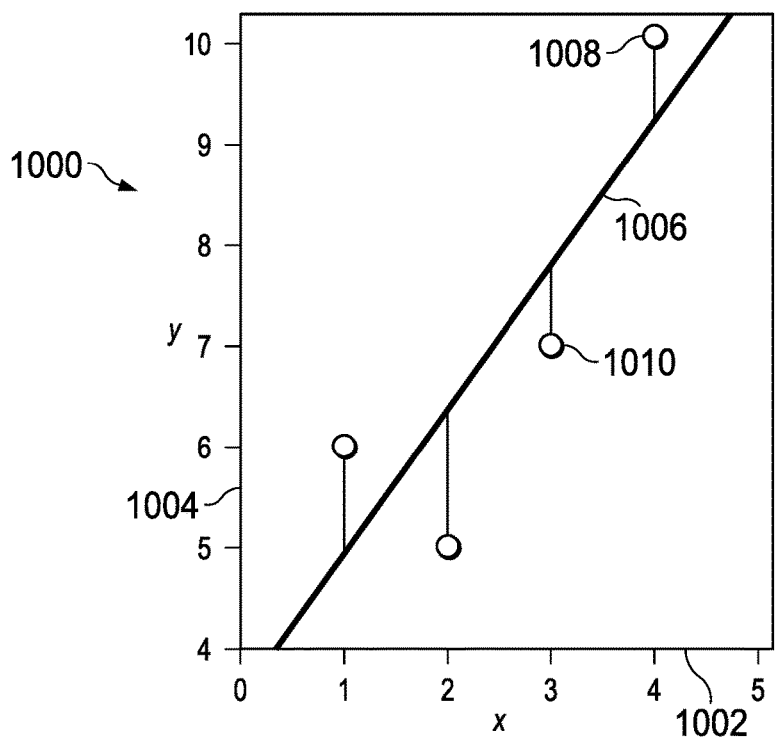
FIG. 10 is an illustration of an annotator point line, according to one embodiment.

In FIG. 10, an illustration of an annotator point line is shown, according to one embodiment. A graph 1000 has an X-axis 1002, a Y-axis 1004, a Z-axis (not shown and is optional), an annotator line 1006, one or more incremental annotators 1008, and one or more decremental annotators 1010.

In one example, the communication monitoring system utilizes a confidence vs. sensitivity level procedure. When an AI annotator runs, the communication monitoring system ingest a paragraph, a sentence, or a "token" (a single word or word phrase). The annotator analyzes these and determines whether to apply an annotation or not to that location in the communication. This decision comes with a confidence level. In other words, the annotator process is applying the annotation with X % confidence. The higher the confidence level, the more certain the annotator process is that the communication actually deals with a particular topic (or displays a particular characteristic). Sensitivity, on the other hand, is a human-configured parameter. It is configured at the rules layer, after the annotation process has occurred on a document. So, at this point all annotations have already been made.

For example, if an annotator is looking for flirtatious language and evaluating a customer service communication that includes the phrase "my pleasure," this annotator would annotate the token (word phrase) as being flirtatious, but it would have a low confidence level in that annotation, say 14%.

At the rules layer, if the communication monitoring system were looking to warn agents about using flirtatious language, the communication monitoring system may have a rule with a sensitivity of 60% or higher. This means that it would only trigger the warning above 60%.

In another example of combinatory nature of annotators, the communication monitoring system may use a process related to a linear regression (and/or any other mathematical modeling(s), mathematical analysis, etc.) where a bunch of points plotted on a graph. Please note that linear regression analysis is being utilized because it is the easiest way to explain the process. However, a multi-dimensional analysis and/or modeling could be and is being utilized. The simplest way to express a relationship between them is by minimizing the mean squared errors to represent them with a line. In this example, points above the line increase the plot, points below it decrease it. This is similar to how certain annotators can increment or decrement the slope of the graph. For example, the word "moron" may be incremental (reference number 1008) to an annotator relating toxic language and the word "hard-worker" may decrement (reference number 1010) that annotator. The combination of these two words/phrases (tokens) are weighed against each other in determining confidence. The line itself may be an abstraction of the plotted points, but it serves as a means of representing the trend. The analogy of the line is similar to idea graph and the plotted points are annotators. Once the communication monitoring system plots the points and draw the line, we now have a graphical representation of meaning.

The communication monitoring system then may take that line and compare it to a bunch of other lines to look at similarity. These other lines may be the rules engine(s). If a rules engine line is similar enough to our meaning line, then we trigger the rule. In one example, the lines are vectors and instead of 2 dimensional space, we do it in a multidimensional way.

Figure 11A:
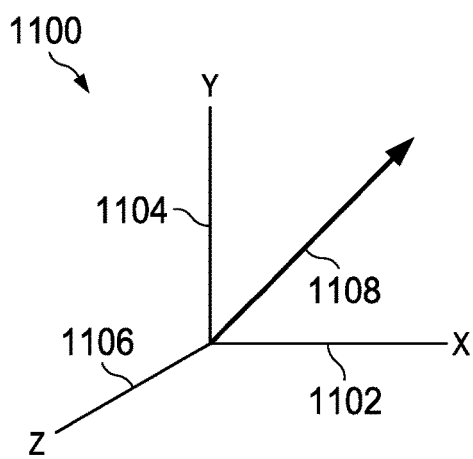
FIGS. 11A-11C are illustrations of a comparison of the annotator point line to reference annotator point line(s), according to various embodiments.
Figure 11B:
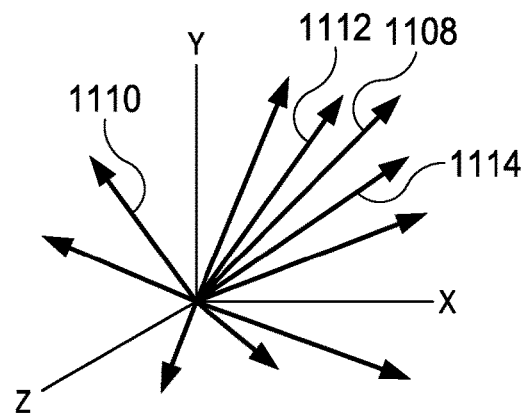
Figure 11C:
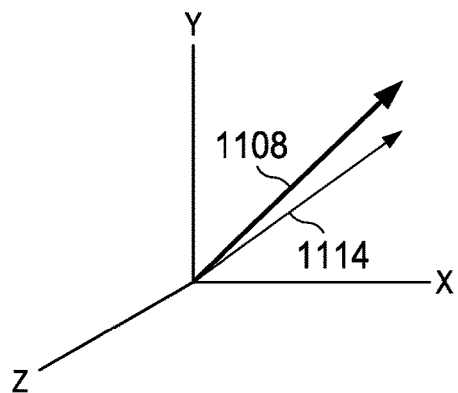

In FIGS. 11A-11C, illustrations of a comparison of the annotator point line to a reference annotator point line are shown, according to various embodiments. Reference FIG. 11A, a graph 1100 includes an X-axis 1102, a Y-axis 1104, a Z-axis, and an annotator line 1108. In FIG. 11B, the annotator line 1108 is compared to a plurality of reference annotator lines 1100. The communication monitoring system examines all of the plurality of reference annotator lines and may select one or more reference annotator lines 1100 which are within a predetermined and/or dynamic threshold of the annotator line 1108. In this example, a first reference annotator line 1112 and an Nth annotator line 1114 may be within the predetermined and/or dynamic threshold. In FIG. 11C, the communication monitoring system has selected the Nth annotator line 1114 based on predetermined procedures, dynamic procedures, machine learning, and/or a combination of one or more therein. It should be noted that the graphs may be two-dimensional and/or three-dimensional. Further, the graphs may be 2-100 dimensions or 1-Nth dimensions.

Figure 12:
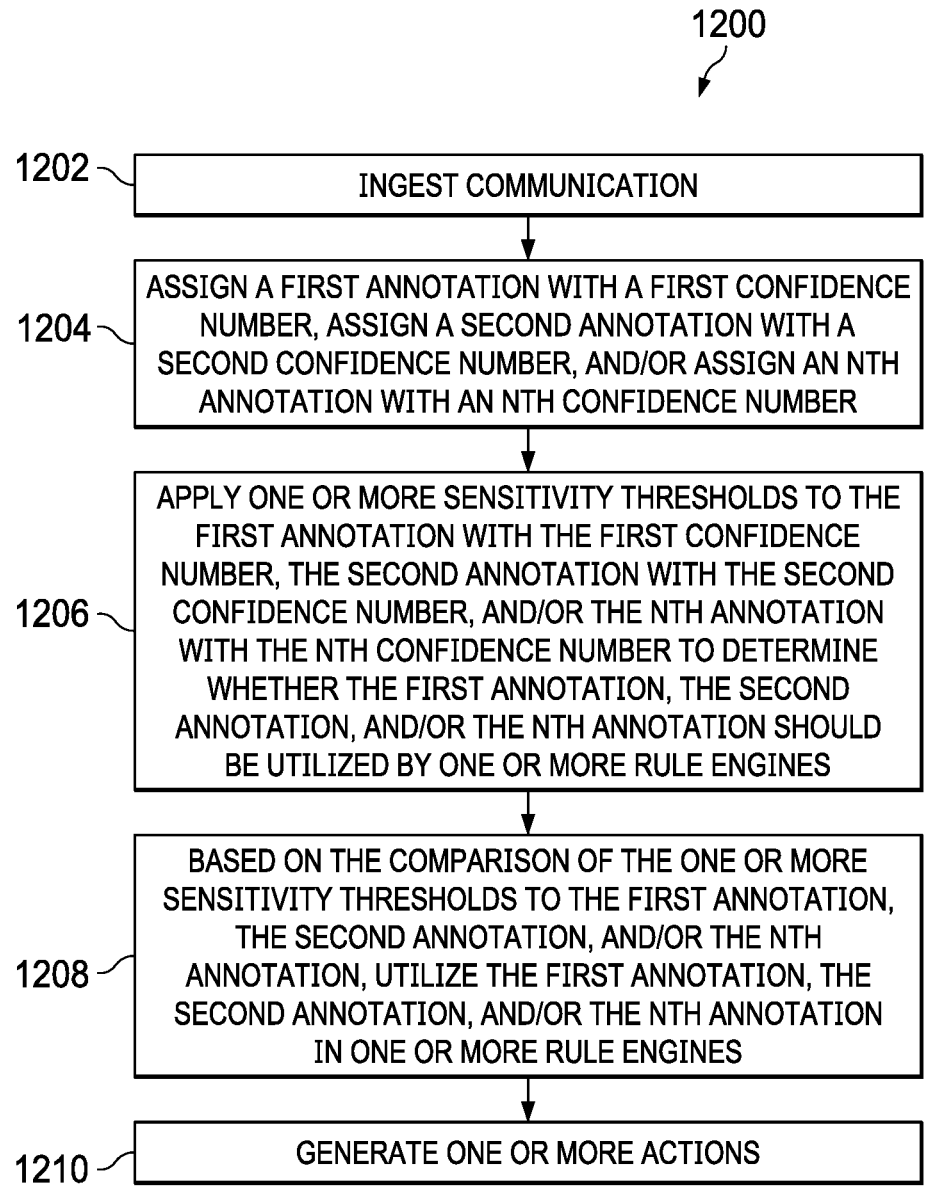
FIG. 12 is another procedural flow chart, according to one embodiment.

In FIG. 12, an annotation procedural flow chart is shown, according to one embodiment. A method 1200 may include via one or more processors ingesting a communication (step 1202). The method 1200 may include via one or more processors assigning a first annotation with a first confidence number, assigning a second annotation with a second confidence number, and/or assigning an Nth annotation with an Nth confidence number (step 1204). The method 1200 may include via one or more processors applying one or more sensitivity thresholds to the first annotation with the first confidence number, applying one or more sensitivity thresholds to the second annotation with the second confidence number, and/or applying one or more sensitivity thresholds to the Nth annotation with the Nth confidence number to determine whether the first annotation, the second annotation, and/or the Nth annotation should be utilized by one or more rule engines (step 1206). The method 1200 may include a step that based on the comparison of the one or more sensitivity thresholds to the first annotation, the second annotation, and/or the Nth annotation, utilizing via one or more processors the first annotation, the second annotation, and/or the Nth annotation in one or more rule engines (step 1208). The method 1200 may include via one or more processors generating one or more actions (step 1210). In one example, the communication monitoring system may apply a 20% confidence level to the word dog, a 50% confidence level to the word overweight, a 60% confidence level to the word fat, and/or an 80% confidence level to the word ugly. A harassment rule may have a 70% level to trigger a flag. Therefore, only the term ugly by itself would trigger this flag. However, the combination of do and overweight may have a combined confidence level of 65% which would not trigger the flag but a combination of dog and fat may have a combined confidence level of 72% which would trigger the flag.

In one example, the communication monitoring system architecture includes annotators (e.g., modules, devices, methods, and/or machines that add labels to text). The machines can be AI driven, a simple list of words, or language matchers which look for combinations of noun+adjective, noun+verb, verb+adv. If an annotator is triggered, a piece of text gets a label, rules (e.g., rules are combinations of annotators). So, you could have a boasting language annotator, derogatory language annotator, a female subject annotator, etc. that would all be looking for somebody bragging about treating a female in the workplace inappropriately. This would comprise one rule and/or campaigns (e.g., combining rules to make campaigns). So, if you wanted to have a campaign about workplace culture, you would likely include a rule like the one above. This system allows companies to express any risk in the communication monitoring system. So, everything from financial bribery to foreign corrupt practices to sexism in the workplace to simple swearing. These campaigns can then be targeted to specific software platforms (e.g., emails only, or chats and emails, or customer service emails and chats, etc.). Further, these campaigns can be targeted to employee groups (e.g., apply campaign 1 to the sales team only or apply all campaigns to everybody, except the legal team, etc.).

One other piece of interesting technology is finding (and minimizing language pathways). A campaign can be expressed as a pathway between words (e.g., mathematically). Similarly, meaning can be expressed as a mathematical pathway (or relationship) between words as well. The communication monitoring system may minimize the distance between these pathways to: 1) better capture meaning/understanding and 2) map "meaning pathways" to "campaign pathways" to reduce false positives.

Figure 13:
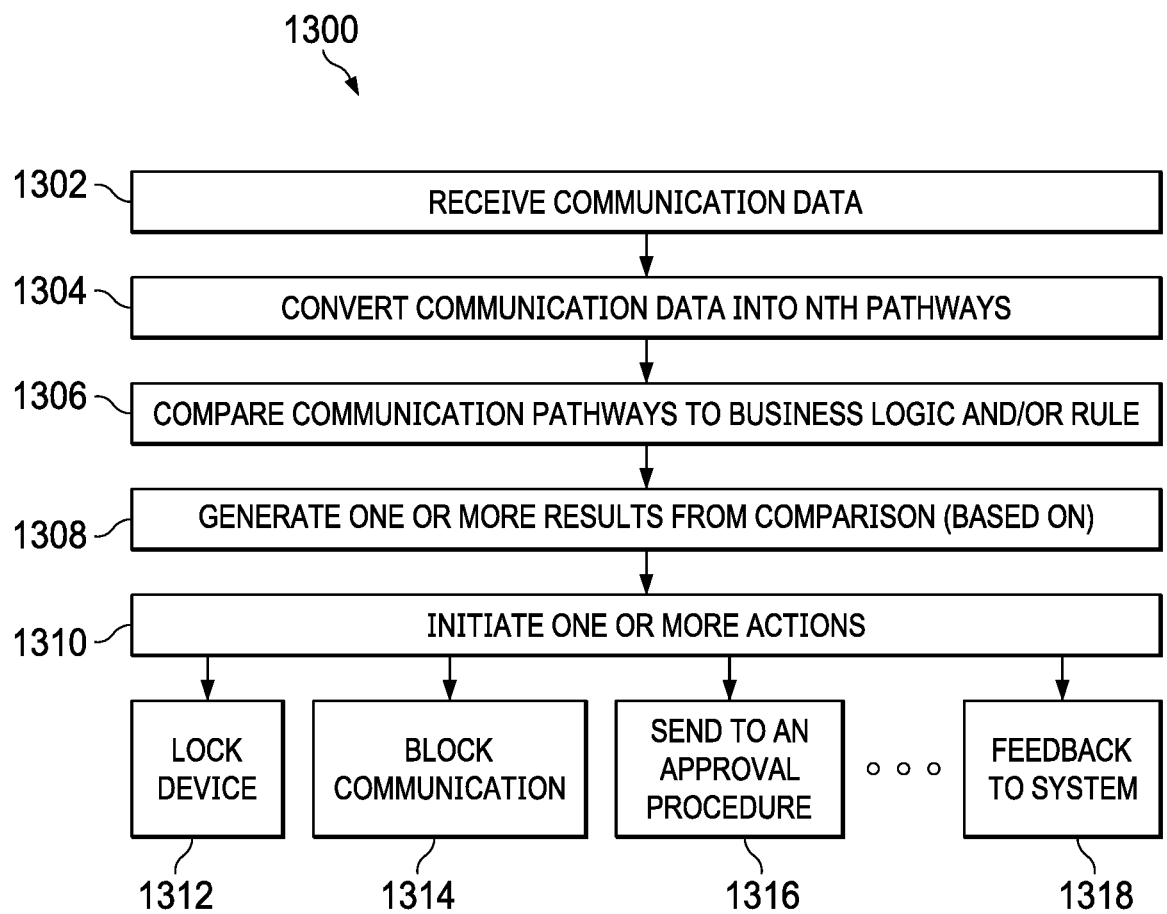
FIG. 13 is another procedural flow chart, according to one embodiment.

In FIG. 13, a communication pathways procedural flow chart is shown, according to one embodiment. A method 1300 may include via one or more processors receiving communication data (step 1302). The method 1300 may via one or more processors convert the communication data into Nth pathways (step 1304). The method 1300 may include via one or more processors comparing one or more communication pathways to business logic and/or rules (step 1306). The method 1300 may include via one or more processors generating one or more results from (based on) the comparison (step 1308). The method 1300 may include via one or more processors initiating one or more actions (step 1310). In one example, the system via one or more processors may lock one or more communication devices (step 1312). In another example, the system via one or more processors may block one or more communications (step 1314). In another example, the system via one or more processors may send one or more communications to an approval procedure (step 1316). In another example, the system via one or more processors may obtain feedback based on any of the steps (e.g., steps 1302-1316). In one example, a communication may include espionage potential and the communication monitoring system would lock the device. In another example, a communication may include profanity and the communication monitoring system may block or erase the profanity. In another example, a communication may include an offer to purchase a company which would be flagged and move to an approval course.

Figure 14A:
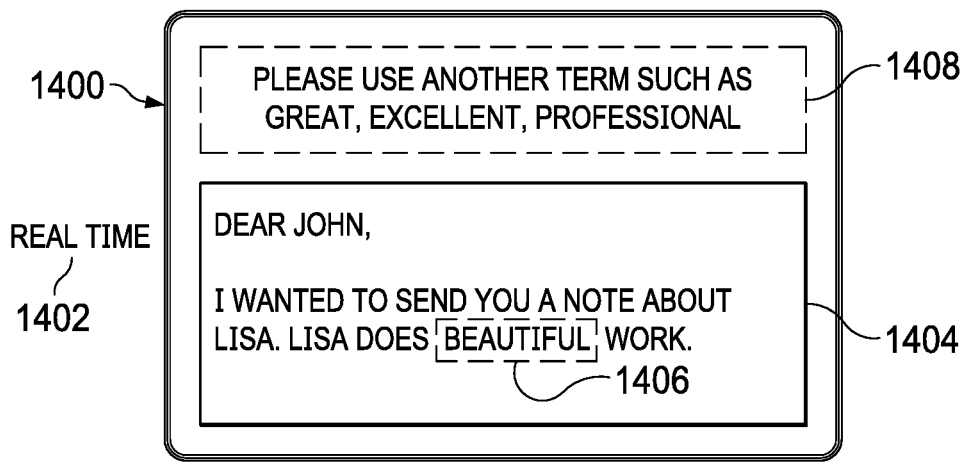
FIGS. 14A-14C are illustrations of actions taken by the communication monitoring system, according to various embodiments.
Figure 14B:
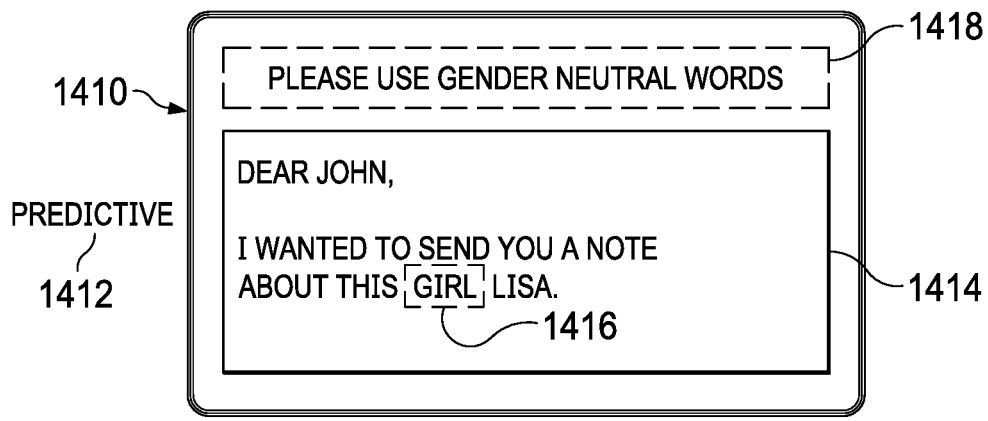
Figure 14C:
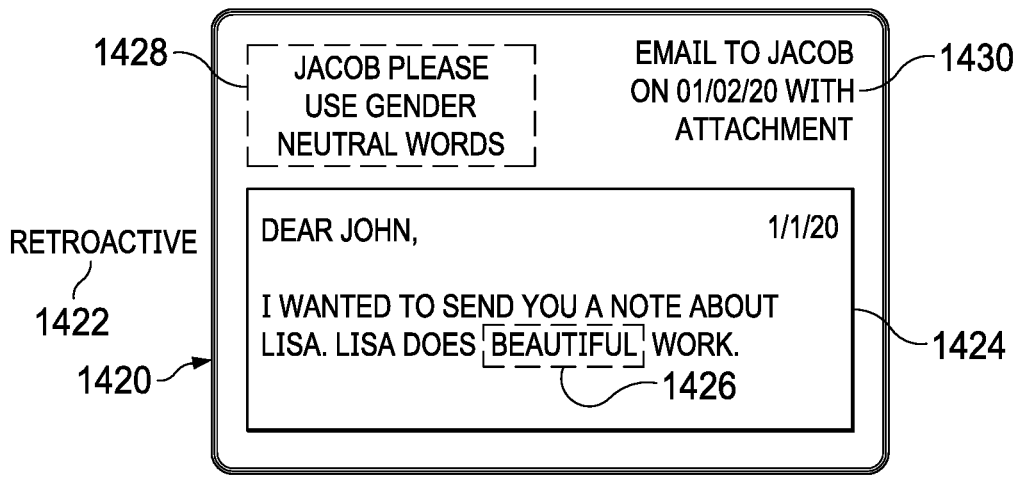

In FIGS. 14A-14C, illustrations of actions taken by the communication monitoring system are shown, according to various embodiments. A first communication monitoring situation 1400 may include a first time period 1402 (e.g., real-time), a first message 1404, a first issue area 1406, and a first remedy action 1408. In this example, the feedback occurs in real time and the first message 1404 includes the phrase "Lisa does beautiful work." In this example, the monitoring system (in real time) has flagged the term beautiful as being the first issue area 1406. Based on flagging this first issue area 1406, the monitoring system generates the first remedy action 1408 which is a message and/or replacement option that states "Please use another term such as great, excellent, professional, etc." A second communication monitoring situation 1410 may include a second time period 1412 (e.g., predictive), a second message 1414, a second issue area 1416, and a second remedy action 1418. In this example, the feedback occurs in a predictive manner (e.g., before the sentence and/or word is finished) and the first message 1404 includes the phrase "a note about the girl Lisa." In this example, the monitoring system (in a predictive manner) has flagged the term girl as being the second issue area 1416. Based on flagging this second issue area 1416, the monitoring system generates the second remedy action 1418 which is a message and/or replacement option that states "Please use gender neutral words". An Nth communication monitoring situation 1420 may include an Nth time period 1422 (e.g., retroactive), an Nth message 1424, an Nth issue area 1426, an Nth remedy action 1428, and a time stamp of the communication. In this example, the feedback occurs in a retroactive manner (e.g., after the communication has been sent) and the Nth message 1420 includes the phrase "Lisa does beautiful work." In this example, the monitoring system (in a retroactive manner) has flagged the term beautiful as being the Nth issue area 1426. Based on flagging this Nth issue area 1426, the monitoring system generates the Nth remedy action 1428 which is a message and/or report replacement option that states "Please use gender neutral words". In this example, the communication is time stamped 1430 to provide better feedback information and/or record keeping.

Figure 15:
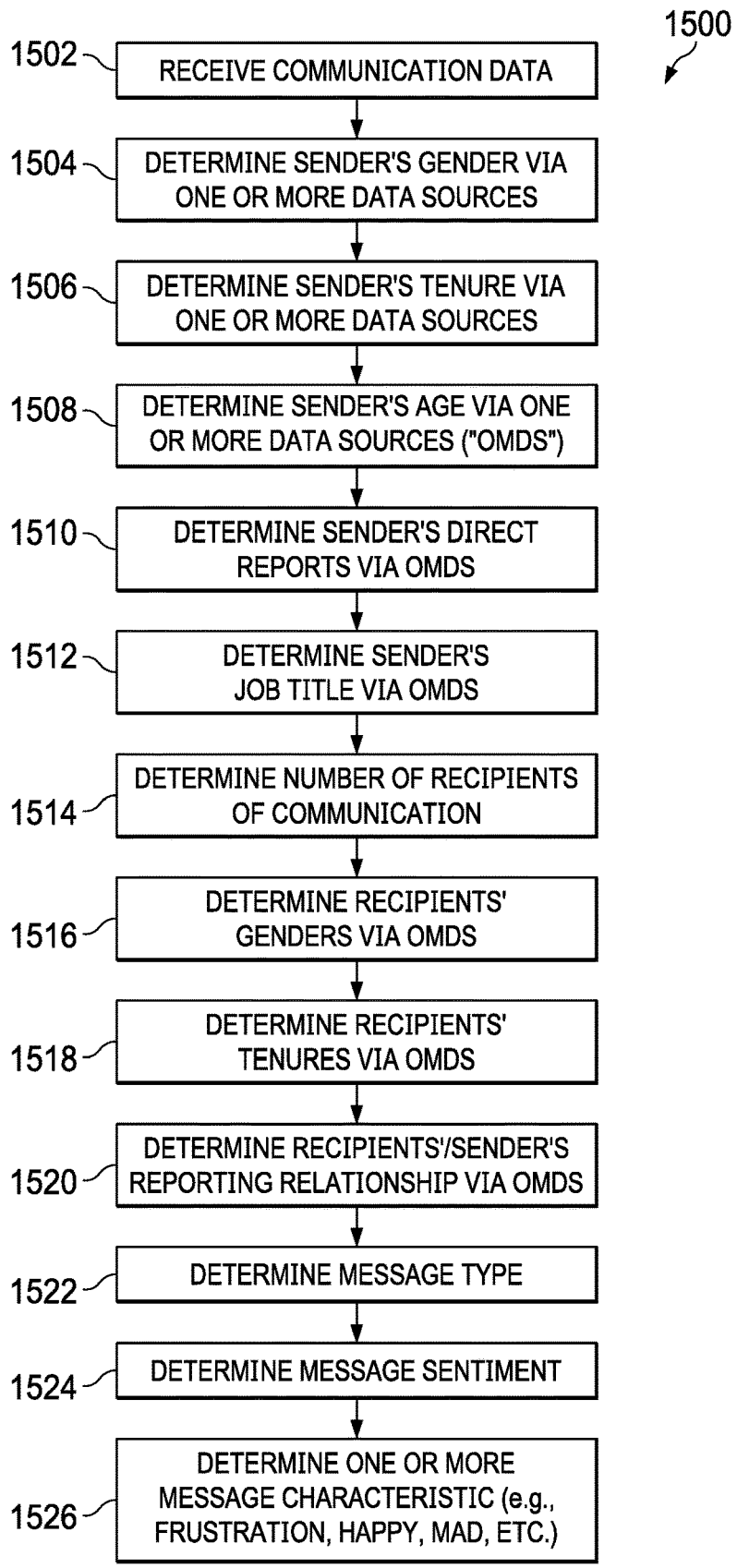
FIG. 15 is another procedural flow chart, according to one embodiment.

In FIG. 15, a communication classification procedural flow chart is shown, according to one embodiment. A method 1500 may include via one or more processors receiving communication data (step 1502). The method 1500 may include via one or more processors determining a sender's gender via one or more data sources (step 1504). The method 1500 may include via one or more processors determining a sender's tenure via one or more data sources (step 1506). The method 1500 may include via one or more processors determining a sender's age via one or more data sources (step 1508). The method 1500 may include via one or more processors determining the sender's direct reports via one or more data sources (step 1510). The method 1500 may include via one or more processors determining a sender's job title via one or more data sources (step 1512). The method 1500 may include via one or more processors determining the number of recipients of the communication data (step 1514). The method 1500 may include via one or more processors determining one or more recipients' gender via one or more data sources (step 1516). The method 1500 may include via one or more processors determine one or more recipients' tenures via one or more data sources (step 1518). The method 1500 may include via one or more processors determining one or more recipients'/sender's reporting relationship via one or more data sources (step 1520). The method 1500 may include via one or more processors determining a message type (step 1522). The method 1500 may include via one or more processors determining a message sentiment (step 1524). The method 1500 may include via one or more processors determining one or more message characteristics (e.g., frustration, happy, mad, etc.) (step 1526).

There can be numerous relationships between the one or more communicator characteristics and one or more recipient characteristics. Some potential characteristics are age, gender, seniority level, tenure, title, underrepresented groups, organization (e.g., Engineering, Marketing, Operations, Manufacturing, Logistics, Sales, etc.), internal group, external group, home country, current country, place of origin, salary, count of direct reports (e.g., size of organization), military or service record, past employment history (e.g., External to Client Company), external government employee, entity of recipient, history of HR issues for the person(s) involved (including ongoing litigation), status of legal holds, past titles/positions (employee or contractor, full time or temp), past positions or former relationships, social capital, and/or any other characteristics disclosed in this document. The communication monitoring system may have the ability to detect words (or phrases, or sentiment, etc.) used in written, oral, or physical communications which can be utilized to determine one or more of the characteristics above.

The communication monitoring system may have access to user information (e.g., demographic, age, gender, protected class) from any source disclosed in this document. In addition, the communication monitoring system may have access to the organizational charts. Further, the communication monitoring system can determine who the communicator (composer, speaker, sender, initiator, etc.) of a missive is. In another example, the communication monitoring system can determine the recipients of a missive. Further, the communication monitoring system can determine that there are multiple recipients of the missive. In addition, the communication monitoring system can analyze whether communication changes depending on the number of recipients. In another example, the communication monitoring system can analyze whether communication changes depending on the age of the recipient(s). Further, the communication monitoring system can determine one or more relationships of the communicator and/or communicator characteristics and recipients and/or recipient characteristics. In addition, the communication monitoring system can analyze whether communication changes depending on the relationship of the communicator (composer, speaker, sender, initiator, etc.) and/or communicator characteristics and recipients and/or recipient characteristics. In one example, this is called "Context".

In one example relating to age, when Bill (age 64) sends an email to William (age 24), the communication monitoring system can identify how older employees speak to younger employees. This is useful because the communication monitoring system can tag this information in training models. Further, this tag can be used to validate whether older employees are communicating effectively with younger employees and vice versa. This effectiveness measure can be a machine learning model.

In one example relating to gender, if a male communicator (composer, speaker, sender, initiator, etc.) sends an email to a female recipient, the communication monitoring system can determine these user characteristics and run special validations for high risk issues like harassment language. the communication monitoring system may also determine if a male communicator (composer, speaker, sender, initiator, etc.) communicates differently when the recipient is female (or male, or if the recipients are a mix of male and female or other gender identities).

In one example relating to seniority level, when a communicator (composer, speaker, sender, initiator, etc.) communicates to a recipient, the communication monitoring system may evaluate the communicator's position in the organization as it relates to seniority. With this information, it is possible to train a model around sentence structure (or phrase, or sentiment, etc.) choice, technical jargon, body language, tone, etc. This information can be evaluated against other individual (or groups of) communications from other communicators (composer, speaker, sender, initiator, etc.) with different seniority. The communication monitoring system may highlight irregularities from senior communicators (composer, speaker, sender, initiator, etc.) or may determine and make available insights on how senior users communicate whether for training purposes or other business uses.

In one example relating to tenure, when a communicator (composer, speaker, sender, initiator, etc.) who has a long tenure (of any length along a distribution), the communication monitoring system may determine the typical characteristics of the communicator's communications. This recipient(s)' tenure may also be evaluated to identify differences, irregularities, similarities, effectiveness, length of communication, tone, body language, sentence structure, etc. of the communication. This can be used to identify risk of employee (or contractor churn). This information can also be used to evaluate a communicator's comfort level in his/her job. This information may be used to develop training materials (for less tenured employees or the communicator him/herself) or identify potential risks to improve overall organizational communication effectiveness.

In one example relating to title, the communication monitoring system may evaluate the title of a communicator or recipient. Relationships based on the titles of the parties involved may be used to determine if titling at the company might have an effect on communication. This information may be used by human resources or people operations to create more effective organizational structures. Moreover, effective communicators of a particular title can be benchmarked against under-performers to improve overall communications within (internal and external) an organization.

In one example, relating to underrepresented groups, the communication monitoring system may identify if a communicator or a recipient is a member of one or more underrepresented groups (whether within the organization or within the broader population). The communication monitoring system may analyze specific communication tendencies of users to identify areas of opportunity when it comes to effectiveness. Further, the communication monitoring system can prevent verbiage that is discriminatory. The communication monitoring system may also identify cases where members of an underrepresented group are unintentionally communicating in an imperfect way as a result of existing discomfort, feelings of uncertainty, and/or lack of psychological safety. These determinations may be made by comparing communications of underrepresented minorities against the majority. This can allow underrepresented groups to have improved voice or say within an organization creating more opportunity for diversity of opinions and overall more effective communications across the organization.

In one example relating to organizations (e.g., Engineering, Marketing, Operations, Manufacturing, Logistics, Sales, etc.), the communication monitoring system may evaluate the organization that a communicator is in. The system may evaluate the recipient(s)' organization as well. This information can highlight whether specific individuals are particularly effective when communicating across organizations. A communicator may be evaluated within his/her group and against other organizations as well as peers when it comes to communications. The insights provided by these evaluations may identify how well a sub-organization communicates as a whole, relative to partner or adjacent organizations, and across organizations. If an organization or individual is communicating in a sub-optimal manner to members inside or outside one's home organization, this may be highlighted. This may be used for training or performance management purposes.

In one example relating to internal group(s) vs. external group(s), the communication monitoring system may be aware of whether the recipient of a communication is internal or external to the client organization. This information may be used to apply specific analysis or rules to the communication. For example, if an internal user is communicating to an external user, specific phrases or information may be eliminated from the communication prior to it being recorded. If a user is using a particular application (e.g., zendesk ticketing client) and the user is speaking to external contractors, the system may prevent the user from communicating certain concepts or internal information (e.g., phrasing indicative of an employment relationship or proprietary or confidential information).

In one example relating to home country or current country or place of origin, the communication monitoring system may determine that a communicator is a resident of the United States and an employee of a US entity via one or more data sources disclosed in this document. The system may further identify that the recipient is a resident of a foreign country or an employee of a foreign entity. The system may apply special rules to the communication. For example, information that the US entity does not want to leave the country or being sent to foreign nationals may be redacted (or a user interface component warning the users of certain risks or a training module may be served in real time) to prevent entity (client) rules from being violated. This is particularly valuable for government contracting firms.

In one example relating to salary, the communication monitoring system may have access to the salary data of communicators and recipients via one or more data sources disclosed in this document. This information may be analyzed to determine the patterns and communication habits of high salaried individuals and/or low salaried individuals (across a spectrum). Machine learning models relating to how these individuals communicate can be extrapolated and applied for training or benchmarking purposes. Further, cultural biases that exist may be identified and the system may also determine whether they are toxic to internal culture (and highlight as much to management).

In one example relating to count of direct reports (e.g., size of organization), the communication monitoring system may have knowledge of how large or small a communicator's organization is (count of direct reports, seniority of direct reports, and other characteristics, etc.) via one or more data sources disclosed in this document. This information may be used to identify the communication characteristics of individuals with managerial duties. The system may highlight patterns to management or identify opportunities for training using this information.

In one example relating to military or service record or past employment history (external to client's company), the communication monitoring system may have knowledge of a communicator or recipient's past employment history. Communications involving these parties may be analyzed and evaluated for effectiveness. This information may be used to create a more beneficial environment for veterans or may be used to create training modules to help organizations take advantage of veterans' vast experience in the business world. Furthermore, if certain organizations have over-representation from specific past companies, the system may evaluate how well these individuals are being incorporated in the cultural communication of the larger organization (especially valuable post acquisition or post-M&A activity).

In one example relating to external government employee, the communication monitoring system may have knowledge of whether a communication is directed towards an employee of the United States government (federal, state, or other) via one or more data sources disclosed in this document. This information may be used to apply specific rules to the communication based on automated rules or rules that have been established by the client. The system may highlight risks to management, prevent the communication, alter the communication, or provide immediate (or after-the-fact) warnings, trainings, or other user interface components to improve the communication.

In one example relating to entity of recipient, the communication monitoring system may have knowledge of a recipient's parent organization (if external). For example, if the recipient is an employee or is affiliated with a competing organization, the system may apply specific rules to the communication. For example, if a member of Yahoo's search team is communicating with an employee of Google or a similar competitor in the industry, the system may apply specific rules to the communication, may prevent it entirely, may display a warning message, may make recommendations to the communicator at the time of communication, before sending, or after the fact.

In one example relating to history of human resource issues for the person(s) involved (including past and/or ongoing litigation), the communication monitoring system may have information relating to the past job performance of the communicator or recipient. This information may be used to aid in the communication's effectiveness. If Bill has a history of performance issues when he receives communications that are demanding, the system may nudge the communicator to choose alternative language to improve overall effectiveness and create a more productive workplace.

In one example relating to status of legal holds, the communication monitoring system may have knowledge of whether persons involved are subject to ongoing litigation holds. This information may be used to apply specific rules to communication. For example, if an individual is on a legal hold involving entity X, that individual may be prevented from sending communications using specific troubled language, or may be prevented from communicating with counterparties in the litigation (including lawyers). The system may also apply logic that promotes the use of attorney client privilege at the discretion of the super administrator or the specific configuration requirements of the client.

In one example relating to past titles/positions (employee or contractor, full time or temporary), the communication monitoring system may be aware of a communicator(s)' or recipient(s)' past relationships with the client entity via one or more data sources disclosed in this document. This information may be used to apply specific rules or logic based on client preferences or automated rules. For example, if a recipient is a former employee but now acts as a contractor, the system may nudge the communicator to avoid specific language that would violate the client entity's wishes as it relates to employee/contractor relationships and the language used with those relationships. Furthermore, the system may be aware of an individual's former employment with a government entity. The system may apply specific rules as it relates to the transmission of proprietary information in the current capacity of the communicator or recipient.

In one example relating to past positions or former relationships, the communication monitoring system may be aware of an individual's past positions, employment relationships, etc. The system may use this information to enforce client rules around the transmission of proprietary information and what is appropriate to send. For example, if a past government employee has been recently hired and sends him/herself information that may be deemed to be proprietary to the government (or past entity), the system can highlight this information, prevent the transmission, or take other measures to de-risk the situation.

In one example relating to social capital, the communication monitoring system may have knowledge of the communicator(s)' or recipient(s)' social capital. This may include social followers (twitter, LinkedIn, Facebook, web page hits, status within social organization, internet "verified" status, Instagram followers, potential reach of communications, number of twitter posts, use of hashtags, etc.). This information may be used to alert individuals (or management) to the potential implications of certain communications. For example, if a social media manager is communicating with a known troll or a journalist or an individual with a significant social following or a publicly elected official, the system may provide some user interface component that alerts a communicator of this fact. Further, the system may apply special rules to the communication in either an automated or configured manner at the discretion of the client.

In another example, body health metrics, such as, body temperature, heart rate, eye dilation, etc. may be utilized by the communication monitoring system.

In FIG. 16, a confidence procedural flow chart is shown, according to one embodiment. A method 1600 may include generating a first noun, a first verb, a first adjective, and/or a first adverb with a first weight/confidence level (step 1602). The method 1600 may include generating a second noun, a second verb, a second adjective, and/or a second adverb with a second weight/confidence level (step 1604). The method 1600 may include generating an Nth noun, an Nth verb, an Nth adjective, and/or an Nth adverb with an Nth weight/confidence level (step 1606). In one example, the communication monitoring system may apply a 20% confidence level to the word dog (e.g., a first noun), a 70% confidence level to the word cow (e.g., a second noun), a 50% confidence level to the word overweight (e.g., a first adjective), a 60% confidence level to the word fat (e.g., a second adjective), an 80% confidence level to the word ugly (e.g., a third adjective), a 50% confidence level to the word wobble (e.g., a first verb), and/or 50% confidence level to the word slow (e.g., a first adverb).

In FIG. 17, a rules procedural flow chart is shown, according to one embodiment. A method 1700 may include developing a rule structure (step 1702). The method 1700 may include creating one or more annotations relating to one or more nouns (step 1704). The method 1700 may include creating one or more annotations relating to one or more verbs (step 1706). The method 1700 may include creating one or more annotations relating to one or more adjectives (step 1708). The method 1700 may include creating one or more annotations relating to one or more adverbs (step 1710). A harassment rule may have a 70% level to trigger a flag. Therefore, only the term ugly by itself would trigger this flag. However, the combination of do and overweight may have a combined confidence level of 65% which would not trigger the flag but a combination of dog and fat may have a combined confidence level of 72% which would trigger the flag. In addition, a combination of the terms slow, wobble, cow, and fat would obtain a 95% confidence level which would trigger a flag.

In FIG. 18, a communication monitoring procedural flow chart is shown, according to one embodiment. A method 1800 may include receiving communication data (step 1802). The method 1800 may include converting the received communication data into machine-readable representation (step 1804). The method 1800 may include tagging the machine-readable representation with one or more annotations (step 1806). The method 1800 may include applying one or more rule engines (step 1808). The method 1800 may determine via one or more processors whether an issue has occurred (step 1810). If there is no issue generated, then the method 1800 may include storing the data (step 1814). If there is an issue generated, then the method 1800 may include initiating one or more actions (step 1812).

Figure 19:
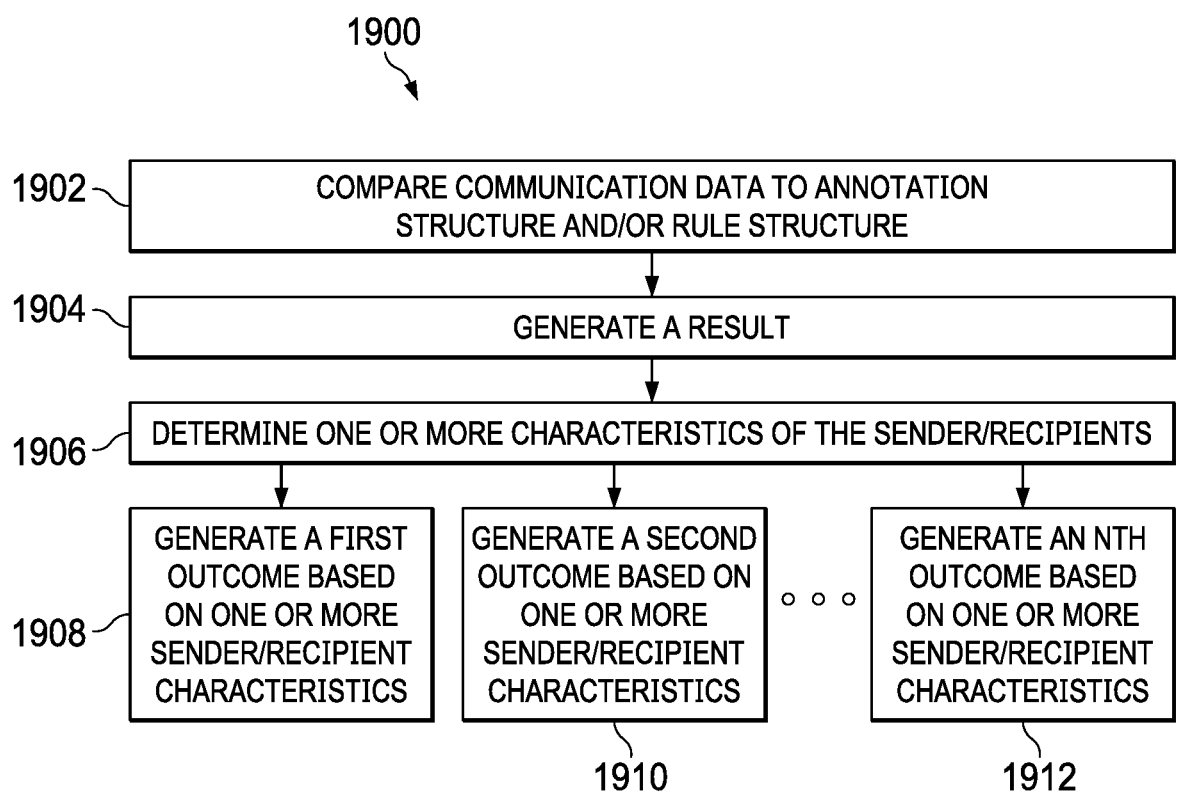
FIG. 19 is another procedural flow chart, according to one embodiment.

In FIG. 19, a communication monitoring procedural flow chart is shown, according to one embodiment. A method 1900 may include comparing communication data to annotation structure and/or rule structure (step 1902). The method 1900 may include generating a result (step 1904). The method 1900 may include determining one or more characteristics of the sender and/or recipients (step 1906). The method 1900 may include generating a first outcome based on one or more sender and/or recipient characteristics (step 1908). The method 1900 may include generating a second outcome based on one or more sender and/or recipient characteristics (step 1910). The method 1900 may include generating an Nth outcome based on one or more sender and/or recipient characteristics (step 1912). In various examples, a male worker may send a communication that states "Let's have a working dinner and/or go for drinks". Based on a first outcome (e.g., both the sender and the recipient being males), the message is sent without a warning. Based on a second outcome (e.g., the sender is male and the recipient is female), the message may generate a warning before being sent out. Based on an Nth outcome (e.g., the sender is male and the recipient is female and is in litigation for harassment against the sending mail), the message is not sent and flagged.

Figure 20A:
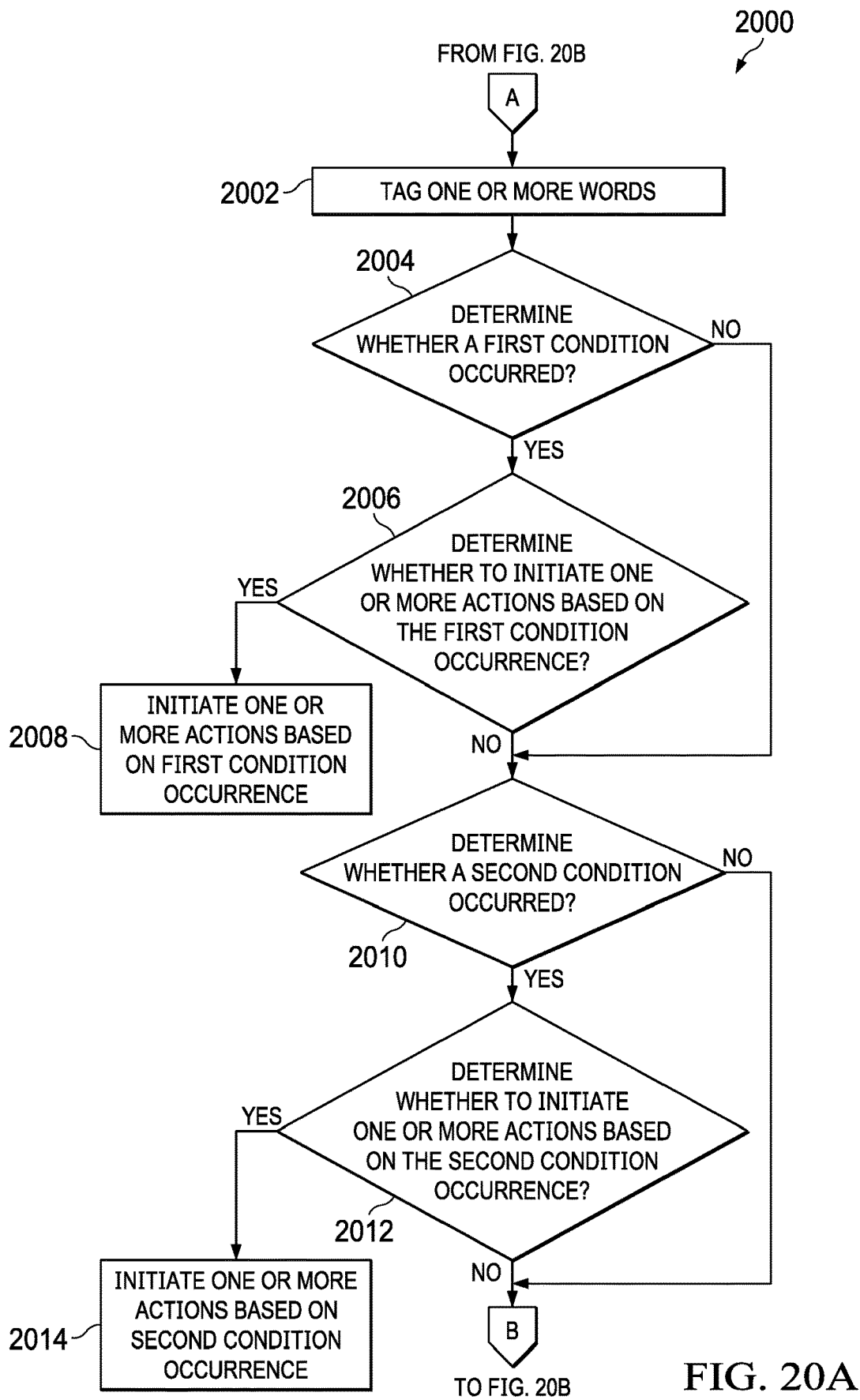
FIGS. 20A-20B is another procedural flow chart, according to one embodiment.
Figure 20B:
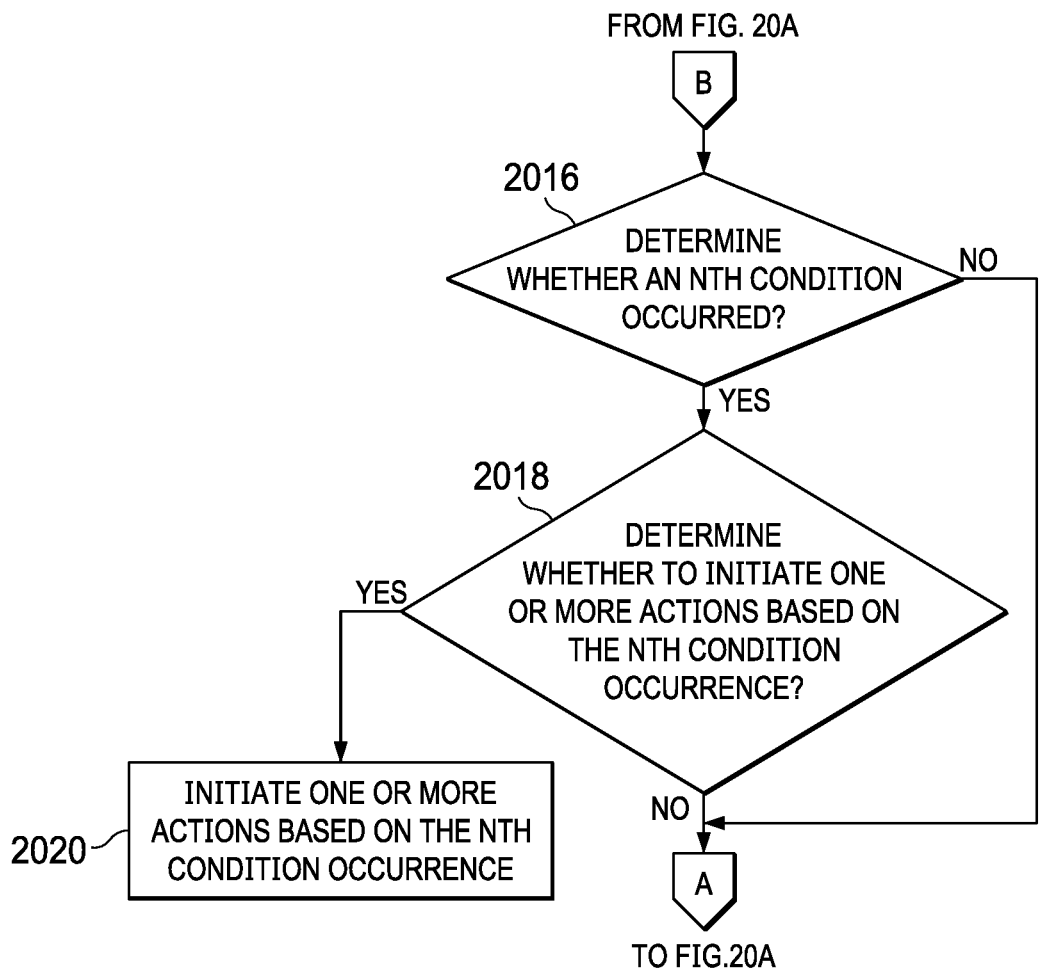

FIGS. 20A-20B, a communication monitoring procedural flow chart is shown, according to one embodiment. A method 2000 may include tagging one or more words (step 2002). The method 2000 may include determining via one or more processors whether a first condition has occurred (step 2004). If the first condition has not occurred, then the method 2000 moves to step 2010. If the first condition has occurred, then the method 2000 may include the one or more processors determining whether to initiate one or more actions based on the first condition occurring (step 2006). If the one or more actions are to be taken, then the method 2000 may include initiating one or more actions based on the first condition occurrence (step 2008). If the one or more actions should not be taken, then the method 2000 may include the one or more processors determining whether a second condition has occurred (step 2010). If the second condition has not occurred, then the method 2000 moves to step 2016. If the second condition has occurred, then the method 2000 may include determining whether to initiate one or more actions based on the second condition occurring (step 2012). If the one or more actions are to be taken, then the method 2000 may include initiating one or more actions based on the second condition occurrence (step 2014). If the one or more actions should not be taken, then the method 2000 may include the one or more processors determining whether an Nth condition has occurred (step 2016). If the Nth condition has not occurred, then the method 2000 moves to step 2002. If the Nth condition has occurred, then the method 2000 may include determining whether to initiate one or more actions based on the Nth condition occurring (step 2018). If the one or more actions are to be taken, then the method 2000 may include initiating one or more actions based on the Nth condition occurrence (step 2020). If the one or more actions should not be taken, then the method 2000 may move back to step 2002. In one example, a first condition is met because a recipient is an under-represented group but no action is taken. Further, a second condition is met because the communication monitoring system determines that the language utilized is belittling and a warning and/or flag is created. In addition, an Nth condition is met because the communication monitoring system determines that the message utilizes threating language. Therefore, the communication monitoring system may stop the communication, alter the communication, and/or flag the communication.

Figure 21:
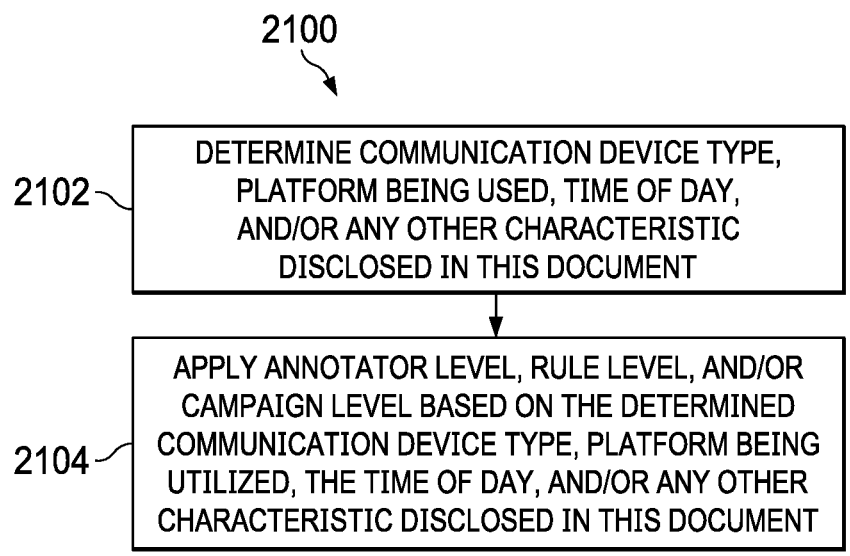
FIG. 21 is another procedural flow chart, according to one embodiment.

In FIG. 21, a communication monitoring procedural flow chart is shown, according to one embodiment. A method 2100 may include determining a communication device type, a location of the communication device, a platform being used, a time of day, and/or any other characteristic disclosed in this document (step 2102). The method 2100 may include applying an annotator level, rule level, and/or campaign level based on the determined communication device type, the platform being used, the time of day, and/or any other characteristic disclosed in this document (step 2104). In one example, a mobile device is being utilized at a bar via the texting function at 2 AM to a person of the opposite sex of the user of the device, the communication monitoring system may flag this communication, stop this communication, and/or take any other action disclosed in this document.

In one embodiment, a system may include: one or more processors and at least one memory device where the one or more processors may receive communication data and convert the received communication data into a machine representation of the received communication data. Further, the one or more processors may utilize one or more annotators with the machine representation of the received communication data to generate an annotated machine representation of the received communication data. In addition, the one or more processors may compare the annotated machine representation of the received communication data to one or more rule engines and transmit an initiation action signal based on the comparison of the annotated machine representation of the received communication data to the one or more rule engines.

In one example, the initiation action signal is implemented in a real time action. In other examples, the real time action includes a language suggestion, a warning, a quarantining of one or more messages, a disabling of a communication device, and/or any other action disclosed in this document. In another example, the initiation action signal is implemented in a retroactive action. Further, a sensitivity procedure and/or a confidence level procedure may be utilized as detailed in the specification. In other examples, the retroactive action includes a first time period report, an index communication list, a historical report, a training class option, a real-time training class, a scheduled training class, and/or any other action disclosed in this document. In another example, the initiation action signal is implemented in a predictive action. In other examples, the predictive action includes a language suggestion, a warning, a quarantining of one or more messages, an approval level requirement, a disabling of the one or more messages, a disabling of a communication device and/or any other action disclosed in this document. Further, the sensitivity procedure and/or the confidence level procedure as detailed in the specification may be utilized with any example disclosed in this document. In another example, based on the predictive action being one of the quarantining of one or more messages, the approval level requirement, the disabling of the one or more messages, or the disabling of the communication device, the one or more processors may transmit an approval requirement signal to a review process. This approval procedure may be automated and/or involve human interaction.

In another embodiment, an apparatus may include: one or more processors and at least one memory device where the one or more processors may receive communication data and convert the received communication data into a machine representation of the received communication data. Further, the one or more processors may obtain data from a contractor data source, a corporation data source, a court data source, a legal data source, a social capital data source, a human resources data source, a contract data source, Internet data, one or more sensors, one or more cameras, one or more body devices, one or more microphones, a governmental data source, and/or any other data source disclosed in this document. The one or more processors may utilize one or more annotators with the machine representation of the received communication data to generate an annotated machine representation of the received communication data. The one or more processors may compare the annotated machine representation of the received communication data to one or more rule engines. The one or more processors may transmit an initiation action signal based on the comparison of the annotated machine representation of the received communication data to the one or more rule engines.

In another example, a first annotator is a gender of a sender of the communication data. In another example, the first annotator was derived from data received from the human resources data source. In another example, a second annotator is a country of origin of a first recipient of the communication data. In various examples, the country of origin may be based on Internet Protocol (IP) address and/or other data source in specification. In another example, a third annotator is based on one or more characteristics of a message in the communication data. In another example, the one or more characteristics of the message may be determined via an annotator protocol applied to the communication data.

In another embodiment, a device may include: one or more processors; one or more memory devices including one or more modules; and a transceiver configured to receive communication data. The one or more processors may dissect the received communication data into one or more elements where the one or more elements are a subset of one or more communication elements. The one or more processors may obtain data from a contractor data source, a corporation data source, a court data source, a legal data source, a social capital data source, a human resources data source, a contract data source, Internet data, one or more sensors, one or more cameras, one or more body devices, one or more microphones, a governmental data source, and/or any other source disclosed in this document. The one or more processors may utilize one or more annotators with the one or more elements to generate an annotated representation of the one or more elements. The one or more processors may compare the annotated representation of the one or more elements to one or more rule engines. The one or more processors may transmit an initiation action signal based on the comparison of the annotated representation of the one or more elements to the one or more rule engines.

In another example, the one or more processors may initiate one or more actions from the device based on a time of day, a device location, a device type, a recipient data, a message type, a sender type, a sender's history, a sender's data, the sender type and sender location, a recipient type, a recipient's history, a recipient's data, the receipt type and a recipient location, and/or any other characteristic disclosed in this document. In another example, the one or more actions may include restricting communications which includes disabling the device, blocking a communication package, and/or transmitting the communication package to an approval level. In another example, the communication package is the received communication data. In another example, the communication package is a subset of the received communication data.

While the communication monitoring system has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "another example," and/or similar language, should be considered to mean that the particular features, structures, or characteristics may be combined in one or more examples. Any combination of any element in this disclosure with any other element in this disclosure is hereby disclosed and only not listed for clarity and brevity.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

It should be noted that any of the elements in any figure and/or any line may be combined with other elements in any other figure and/or any other line. In other words, an element from FIG. 2 may be combined with an element from FIG. 8, and/or FIG. 7A, and/or FIG. 6, and/or FIG. 5, and/or FIG. 4, and/or FIG. 3, and/or FIG. 9A, and/or FIG. 9B, and/or FIG. 1. Any figure and/or line may replace FIG. 2 in the above-referenced analysis. For example, one or more of the elements disclosed on page 6, lines 2-5 could be combined with one or more of the elements disclosed on page 6, lines 7-11 and/or any element disclosed on page 9.

The invention claimed is:

1. A system comprising:
at least one memory device; and
one or more processors configured to:
receive communication data and convert the received communication data into a machine representation of the received communication data, wherein the machine representation of the communication data comprises a graph of one or more tokens contained in the received communication data, and wherein the one or more tokens are logically connected by a plurality of pathways;
utilize one or more annotators with the machine representation of the received communication data to generate an annotated machine representation of the received communication data based on the plurality of pathways of the graph of one or more tokens, wherein the annotated machine representation comprises an annotator line in a two-or-more dimensional coordinate space fitted to annotator points, wherein each annotator point represents a coordinate value in the two-or-more dimensional coordinate space of each of the one or more annotators;
compare the annotator line to one or more reference annotator lines to obtain one or more similarity scores between the annotator line and the one or more reference annotator lines;
identify one or more specified reference annotator lines associated with similarity scores exceeding threshold values; and
transmit an initiation action signal based on one or more rules associated with the one or more specified reference annotator lines.

2. The system of claim 1, wherein the initiation action signal implements a real time action.

3. The system of claim 2, wherein the real time action includes at least one of: a language suggestion, a warning, a quarantine of one or more messages, or a disabling of a communication device.

4. The system of claim 1, wherein the initiation action signal implements a retroactive action.

5. The system of claim 4, wherein the retroactive action includes at least one of: a first time period report, an index communication list, a historical report, a training class option, a real-time training class, or a scheduled training class.

6. The system of claim 1, wherein the initiation action signal implements a predictive action.

7. The system of claim 6, wherein the predictive action includes at least one of: a language suggestion, a warning, a quarantine of one or more messages, an approval level requirement, a disabling of the one or more messages, or a disabling of a communication device.

8. The system of claim 7, wherein the one or more processors are configured to transmit an approval requirement signal to a review process based on the predictive action.

9. An apparatus comprising:
at least one memory device; and
one or more processors,
wherein the one or more processors are configured to:
receive communication data,
convert the received communication data into a machine representation of the received communication data,
obtain data from at least one of: a contractor data source, a corporation data source, a court data source, a legal data source, a social capital data source, a human resources data source, a contract data source, Internet data, one or more sensors, one or more cameras, one or more body devices, one or more microphones, or a governmental data source,
apply one or more annotators to one or more tokens the machine representation of the received communication data to generate an annotated machine representation of the received communication data, wherein the annotated machine representation of the communication data is based on a graph of the one or more tokens contained in the received communication data, wherein the one or more tokens of the graph are logically connected by a plurality of pathways, wherein the annotated machine representation comprises an annotator line in a two-or-more dimensional coordinate space fitted to annotator points, and wherein each annotator point represents a coordinate value in the two-or-more dimensional coordinate space of each of the one or more annotators,
compare the annotator line to one or more reference annotator lines to obtain one or more similarity scores between the annotator line and the one or more reference annotator lines,
identify one or more specified reference annotator lines associated with similarity scores exceeding threshold values, and
transmit an initiation action signal based on one or more rules associated with the one or more specified reference annotator lines,
wherein the annotated machine representation comprises a line in a two-or-more dimensional coordinate space fitted to points representing at least one of: the one or more tokens or the pathways logically connecting the one or more tokens.

10. The apparatus of claim 9, wherein a first annotator is a gender of a sender of the communication data.

11. The apparatus of claim 10, wherein the first annotator is derived from data received from the human resources data source.

12. The apparatus of claim 9, wherein a second annotator is a country of origin of a first recipient of the communication data.

13. The apparatus of claim 12, wherein the second annotator is derived from an Internet Protocol address.

14. The apparatus of claim 9, wherein a third annotator is based on one or more characteristics of a message in the communication data.

15. The apparatus of claim 14, wherein the one or more characteristics of the message are determined via an annotator protocol applied to the communication data.

16. A device comprising;
one or more processors;
at least one memory device including one or more modules; and
a transceiver configured to receive communication data;
wherein the one or more processors are configured to:
dissect the received communication data into one or more elements where the one or more elements are a subset of one or more communication elements,
obtain data from at least one of a contractor data source, a corporation data source, a court data source, a legal data source, a social capital data source, a human resources data source, a contract data source, Internet data, one or more sensors, one or more cameras, one or more body devices, one or more microphones, or a governmental data source,
utilize one or more annotators with the one or more elements to generate an annotated representation of the one or more elements, wherein the annotated representation of the one or more elements is based on a graph of the one or more elements, wherein the one or more elements of the annotated representation are logically connected by a plurality of pathways, and wherein the annotated representation comprises an annotator line in a two-or-more dimensional coordinate space fitted to annotator points, wherein each annotator point represents a coordinate value in the two-or-more dimensional coordinate space of each of the one or more annotators,
compare the annotator line to one or more reference annotator lines to obtain one or more similarity scores between the annotator line and the one or more reference annotator lines,
identify one or more specified reference annotator lines associated with similarity scores exceeding threshold values, and
transmit an initiation action signal based on the one or more specified reference annotator lines,
wherein the annotated representation comprises a line in a two-or-more dimensional coordinate space fitted to points representing at least one of: one or more tokens or the pathways logically connecting the one or more tokens.

17. The device of claim 16, wherein the one or more processors are configured to initiate one or more actions from the device based on at least one of a time of day, a device location, a device type, a recipient data, a message type, a sender type, a sender's history, a sender's data, the sender type and sender location, a recipient type, a recipient's history, a recipient's data, or a recipient location.

18. The device of claim 17, wherein the one or more actions include restricting communications which includes at least one of disabling the device, blocking a communication package, or transmitting the communication package to an approval level.

19. The device of claim 18, wherein the communication package is the received communication data.

20. The device of claim 18, wherein the communication package is a subset of the received communication data.

* * * * *